(12) United States Patent
Ishikawa

(10) Patent No.: US 12,493,272 B2
(45) Date of Patent: Dec. 9, 2025

(54) INFORMATION PROCESSING DEVICE AND AN INFORMATION PROCESSING METHOD

(71) Applicant: PARAMOUNT BED CO., LTD., Tokyo (JP)

(72) Inventor: Takashi Ishikawa, Tokyo (JP)

(73) Assignee: PARAMOUNT BED CO., LTD., Tokyo (JP)

( * ) Notice: Subject to any disclaimer, the term of this patent is extended or adjusted under 35 U.S.C. 154(b) by 360 days.

(21) Appl. No.: 18/117,270

(22) Filed: Mar. 3, 2023

(65) Prior Publication Data

US 2024/0069512 A1 Feb. 29, 2024

(30) Foreign Application Priority Data

Aug. 26, 2022 (JP) ................. 2022-135192

(51) Int. Cl.
*G05B 19/042* (2006.01)
*G06K 7/10* (2006.01)
*G06K 19/07* (2006.01)

(52) U.S. Cl.
CPC ....... *G05B 19/042* (2013.01); *G06K 7/10366* (2013.01); *G06K 19/0723* (2013.01); *G05B 2219/2642* (2013.01)

(58) Field of Classification Search
CPC .......... G05B 19/042; G05B 2219/2642; G05B 19/12; G06K 7/10366; G06K 19/0723
See application file for complete search history.

(56) References Cited

U.S. PATENT DOCUMENTS

| 10,911,911 | B1* | 2/2021 | Wang | H04W 4/029 |
| 2007/0040692 | A1* | 2/2007 | Smith | A61B 5/1115 |
| | | | | 340/573.1 |
| 2007/0080801 | A1* | 4/2007 | Weismiller | G01S 5/0226 |
| | | | | 340/539.13 |
| 2010/0127866 | A1* | 5/2010 | Klein | A61B 5/1113 |
| | | | | 340/541 |

(Continued)

FOREIGN PATENT DOCUMENTS

| JP | 2004-159804 A | 6/2004 |
| JP | 2004-159808 A | 6/2004 |

(Continued)

*Primary Examiner* — Zhipeng Wang
(74) *Attorney, Agent, or Firm* — Birch, Stewart, Kolasch Birch, LLP

(57) ABSTRACT

An information processing device operated in a operation mode including at least a user mode and a care mode, the information processing device includes a communicator configured to transmit a control signal for executing control to a peripheral device, a memory configured to store control contents in association with the user mode and the care mode, respectively, the control content being performed by the peripheral device, and a controller configured to control the communicator to transmit the control signal to the peripheral device to perform the control content associated with the user mode when only a first user is detected in a room by using a detection device for detecting presence of a person in the room, and to control the communicator to transmit the control signal to the peripheral device to perform the control content associated with the care mode when a second user is further detected in the room by using the detection device.

18 Claims, 17 Drawing Sheets

(56) References Cited

U.S. PATENT DOCUMENTS

| | | | |
|---|---|---|---|
| 2011/0227739 A1* | 9/2011 | Gilham | G16H 40/63 |
| | | | 345/545 |
| 2014/0142963 A1* | 5/2014 | Hill | G16H 10/60 |
| | | | 705/2 |
| 2014/0337055 A1* | 11/2014 | Barnes | G06Q 10/06 |
| | | | 705/3 |
| 2015/0206415 A1* | 7/2015 | Wegelin | G08B 21/245 |
| | | | 340/573.4 |
| 2015/0359070 A1* | 12/2015 | Mead | H05B 47/155 |
| | | | 315/154 |
| 2016/0100696 A1 | 4/2016 | Palashewski et al. | |
| 2016/0183864 A1* | 6/2016 | Kusens | A61B 5/11 |
| | | | 340/573.1 |
| 2016/0270574 A1 | 9/2016 | Dekar | |
| 2019/0175093 A1 | 6/2019 | Suzuki | |
| 2020/0007354 A1* | 1/2020 | O'Neill | H04L 12/282 |
| 2020/0205726 A1* | 7/2020 | Lee | A61B 5/1126 |
| 2020/0221977 A1* | 7/2020 | Tanaka | A61B 5/744 |
| 2020/0253384 A1 | 8/2020 | Kubota et al. | |
| 2022/0052867 A1* | 2/2022 | Nakano | H04W 4/023 |
| 2022/0101847 A1* | 3/2022 | Receveur | H04R 5/02 |
| 2022/0117776 A1 | 4/2022 | Nishiura et al. | |
| 2022/0401689 A1* | 12/2022 | Campanella | A61M 21/00 |

FOREIGN PATENT DOCUMENTS

| | | |
|---|---|---|
| JP | 2004-159809 A | 6/2004 |
| JP | 2010-134924 A | 6/2010 |
| JP | 2019-155072 A | 9/2019 |
| JP | 2022-66970 A | 5/2022 |
| JP | 2022-133183 A | 9/2022 |
| WO | WO 2019/176190 A1 | 9/2019 |

* cited by examiner

FIG. 3

| TYPES OF CARE | STAGES OF CARE | CONTROL CONTENT |
|---|---|---|
| EXCRETION ASSISTANCE | BEFORE THE START OF CARE | TURN ON LIGHTS IN A SPECIFIC POSITION (AT THE FOOT OF THE BED) |
| | | CARRY A DIAPER CART IN PLACE |
| | | RAISE AIR CONDITIONING TEMPERATURE |
| | IN CARE | ADJUSTS THE INTERNAL PRESSURE OF THE MATTRESS TO BE SUITABLE FOR OR EASY TO PLACE IN THE LATERAL POSITION |
| | AFTER CARE IS COMPLETED | INCREASE THE OPERATING STRENGTH OF THE AIR PURIFIER |
| | | CARRY A DIAPER CART IN PLACE |
| | | TURN OFF LIGHTS |
| MEAL ASSISTANCE | BEFORE THE START OF CARE | OPEN THE CURTAINS |
| | | TURN ON THE COFFEE MAKER |
| | | TURN ON THE TV |
| | | ADJUST THE ANGLE AND THE HEIGHT OF THE BACK BOTTOM OF THE BED |
| | | MOVE THE TABLE INTO PLACE |
| | IN CARE | AUTOMATIC FEEDING |
| | | TURN ON AUDIO DEVICE |
| | | TURN ON AROMA DIFFUSER |
| | AFTER CARE IS COMPLETED | MOVE THE TABLE INTO PLACE |
| | | ASK FIRST USER WHETHER TO TURN OFF TV, AUDIO DEVICE AND AROMA DIFFUSER |
| TRANSFER ASSISTANCE | BEFORE THE START OF CARE | TURN OFF TV AND AUDIO EQUIPMENT |
| | | ADJUST THE HEIGHT OF THE BED |
| | | CARRY LIFTS AND WHEELCHAIRS IN PLACE |
| | | LOCK WHEELCHAIR CASTERS |
| | IN CARE | RAISE AND LOWER THE HEIGHT OF THE BED |
| | AFTER CARE IS COMPLETED | TURN OFF THE AROMA DIFFUSER AND AIR CONDITIONER |
| | | TURN OFF LIGHTS |

FIG. 4

| DEVICE NAME | DEVICE IDENTIFICATION INFORMATION | LOCATION IDENTIFICATION INFORMATION |
|---|---|---|
| AIR CONDITIONER A | device01 | room01 |
| AROMA DEAFUSER B | device02 | room01 |
| LIGHTING DEVICE C | device03 | room01 |
| CURTAIN D | device04 | room01 |
| AUDIO DEVICE E | device05 | room01 |
| FAN F | device06 | room01 |
| CAMERA G | device07 | room01 |
| ELECTRIC BED H | device08 | room01 |
| TERMINAL DEVICE I | terminal01 | room01 |
| AIR CONDITIONER J | device09 | room02 |
| LIGHTING DEVICE K | device10 | room02 |
| ... | ... | ... |

FIG. 6

| STATE OF THE FIRST USER | GOING OUT | ATTENDANCE | FALLING ASLEEP | DURING REM SLEEP | DURING NON-REM SLEEP | DIAPER CHANGING CARE | DURING NON-REM SLEEP | DURING REM SLEEP | WAKE UP | TRANSFER CARE | EXIT |
|---|---|---|---|---|---|---|---|---|---|---|---|
| OPERATING MODE | OFF MODE | STANDBY MODE | USER MODE | | | CARE MODE (EXCRETION ASSISTANCE) | USER MODE | | | CARE MODE (TRANSFER ASSISTANCE) | OFF MODE |
| CAMERA | on | on | on | on | on | on | on | on | on | on | on |
| FIRST LIGHTING DEVICE | off | on | on/ILLUMINANCE ↓ | off | | on | | off | on | on | off |
| SECOND LIGHTING DEVICE | off | | on/ILLUMINANCE ↓ | off | | on | | off | on | on | off |
| TELEVISION | off | on | off | off | off | off | off | off | on | off | off |
| AUDIO DEVICE | off | on | off | off | off | on | off | off | on | off | off |
| ELECTRIC BED | | on/not move | on/SLOWLY BACK | on/flat | on/RAISE BACK TO WITHIN 10 DEGREES | on/flat, HEIGHT ADJUSTMENT | on/RAISE BACK TO WITHIN 10 DEGREES | on/flat | on/RAISE BACK | on | off/not move |
| MATTRESS | off | on | on | on/INTERNAL PRESSURE LEADING TO A HIGHER SLEEP SCORE | on/INTERNAL PRESSURE LEADING TO A HIGHER SLEEP SCORE | on/rotation | on/INTERNAL PRESSURE WITH THE BEST SLEEP INDEX | on/INTERNAL PRESSURE WITH THE BEST SLEEP INDEX | on/UNLINED | on | off |
| AROMA DIFFUSER | off | on/high | on/GRADUALLY LOWER | on/GRADUALLY LOWER | on/GRADUALLY LOWER | on/RAISE THE TEMPERATURE | on/GRADUALLY UP | on/GRADUALLY UP | on | on | off |
| AIR CONDITIONER | | | | | | | | | | | |
| AIR PURIFIER | off | on/normal | on/normal | on/normal | on/normal | on/strong | on/normal | on/normal | on/normal | on/normal | off |
| CURTAIN | off | on/close (if open) | on/close | on/close | on/close | on/open | on/close | on/close | on/open | on/open | off/keep open |
| COFFEE MAKER | off | off | off | off | off | off | off | off | off if complete | off | off |
| OVEN | off | off | off | off | off | off | off | off | off if complete | off | off |
| DOORS | off | on/close | on/close | on/close | on/close | on/open | on/close | on/close | on/close | on/open | on/open, off/close |

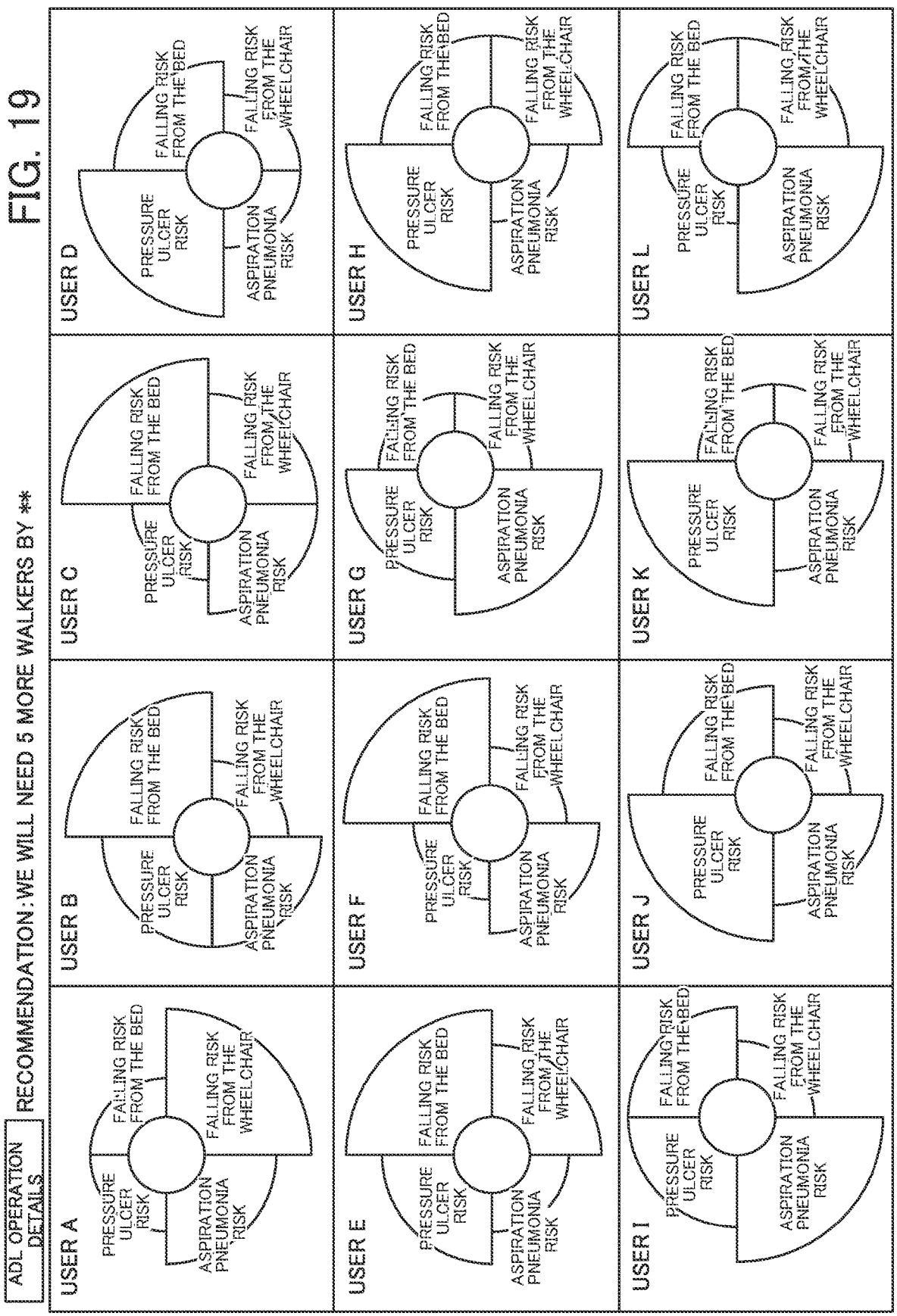

INFORMATION PROCESSING DEVICE AND AN INFORMATION PROCESSING METHOD

CROSS-REFERENCE TO RELATED APPLICATIONS

This Non-provisional application claims priority under 35 U.S.C. § 119(a) on Patent Application No. 2022-135192 filed in Japan on 26 Aug. 2022, the entire contents of which are hereby incorporated by reference.

FIELD

The present embodiment relates to the information processing device and the information processing method.

BACKGROUND

It is known that various techniques to control the surrounding environment according to a sleeping of a user. For example, US patent publication No. 2016/100696 discloses a system for controlling the surrounding environment when the system detects the intention of the user to sleep on a bed or a mattress.

BRIEF DESCRIPTION OF THE DRAWINGS

FIG. 3 shows an example of a table of control contents stored in the storage unit of the information processing device in FIG. 1.

FIG. 4 shows an example of a table of terminal devices and peripheral devices stored in the storage unit of the information processing device in FIG. 1.

FIG. 6 is a timing chart showing the processing flow performed by the information processing device in each modes.

FIG. 19 shows an example of a status display regarding the risk of multiple first users.

DESCRIPTION OF THE PREFERRED EMBODIMENTS

Figure 1:
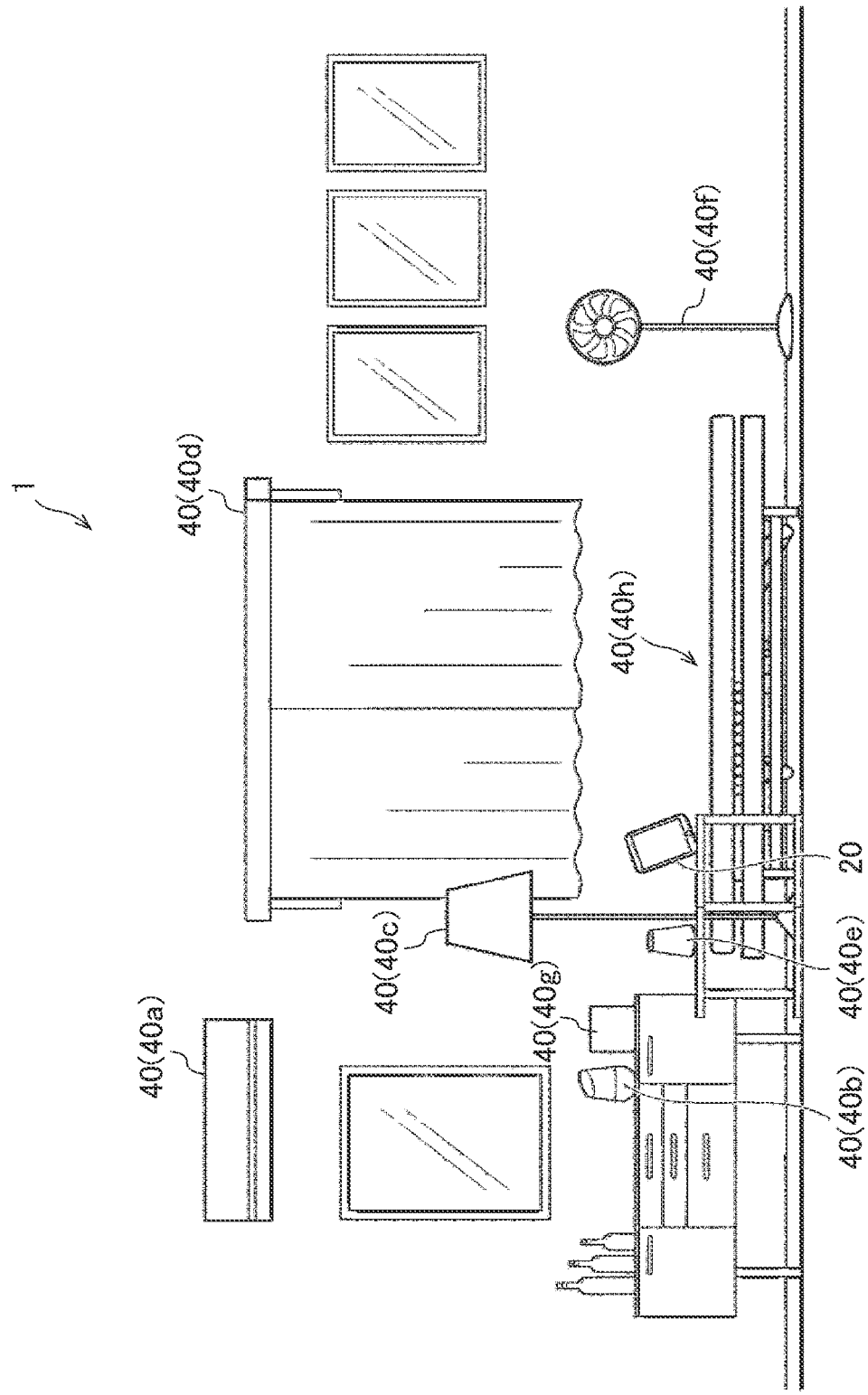
FIG. 1 is a schematic diagram showing a configuration example of a control system according to the first embodiment.

In general, one aspect of the present application is an information processing device operated in a operation mode including at least a user mode and a care mode, the information processing device includes a communicator configured to transmit a control signal for executing control to a peripheral device, a memory configured to store control contents in association with the user mode and the care mode, respectively, the control content being performed by the peripheral device, and a controller configured to control the communicator to transmit the control signal to the peripheral device to perform the control content associated with the user mode when only a first user is detected in a room by using a detection device for detecting presence of a person in the room, and to control the communicator to transmit the control signal to the peripheral device to perform the control content associated with the care mode when a second user is further detected in the room by using the detection device.

Another aspect of the present application is an information processing method performed by an information processing device operated in a operation mode including at least a user mode and a care mode, the information processing device comprising a memory configured to store control contents in association with the user mode and the care mode, respectively, and the control content being performed by a peripheral device, wherein an information processing method includes a step of detecting a user in a room by using a detection device for detecting presence of a person in the room, a step of transmitting a control signal from the communicator of the information processing device to the peripheral device to perform the control content associated with the user mode when only a first user is detected in a room, and a step of transmitting the control signal from the communicator of the information processing device to the peripheral device to perform the control content associated with the care mode when a second user is further detected in the room.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments. Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The present embodiment will be described below with reference to the drawings. In the case of drawings, the same or equivalent elements shall be denoted by the same symbols, and duplicate descriptions shall be omitted. It should be noted that this embodiment described below does not unreasonably limit the contents of the claims. Also, not all of the configurations described in this embodiment are necessarily essential components of this disclosure.

1. First Embodiment 1.1 Examples of System Configurations

The FIG. 1 is a schematic diagram showing a configuration example of a control system 1 according to the first embodiment. The control system 1 is a system that supports a plurality of users. In this embodiment, the user includes a first user and a second user. In this embodiment, the first user is a person who needs a life support, for example, a care recipient or an assisted person. The control system 1 is designed to support a second user in addition to the first user.

Here, the second user is, for example, a person who assists the life of the first user. Specifically, the second user is, for example, a caregiver or an assistant. The caregivers or assistants are collectively referred to as "caregivers" in this specification. For example, when the first user is an elderly or disabled person who needs a nursing care assistance, or a sick or injured person who needs a life support, the second user assists the first user. Hereafter, the second user is described as the caregiver. It should be noted that the caregivers are not necessarily limited to qualified persons such as nurses and care workers, but include all persons who support the life of the first user, such as family members, relatives and friends of the first user.

As shown in the FIG. 1, in the first embodiment, the control system 1 includes terminal device 20 and peripheral devices 40. As shown in the FIG. 1, there are eight the peripherals devices 40, that is, a first peripheral device 40a, a second peripheral device 40b, a third peripheral device 40c, a fourth peripheral device 40d, a fifth peripheral device 40e, a sixth peripheral device 40f, a seventh peripheral device 40g, and an eighth peripheral device 40h. The first peripheral device 40a is an air conditioner. The second peripheral device 40b is an aroma diffuser. The third peripheral device 40c is a lighting device. The fourth peripheral device 40d is an electrically openable curtain. The fifth peripheral device 40e is an audio device. The sixth peripheral device 40f is a blower. The seventh peripheral device 40g is a camera or a human sensor. The eighth peripheral device 40h is an electric bed. However, the control system 1 are not limited to only eight peripheral devices 40. The control system 1 may include one or more peripheral devices 40. Also, the peripheral devices 40 in the control system 1 are not limited to the example shown in the FIG. 1. Other devices may be used as the peripheral devices 40. In this a specification, when one or more peripheral devices are not distinguished with other peripheral devices, they are simply referred to as "peripheral device 40." For example, when the first peripheral device 40a, the second peripheral device 40b, the third peripheral device 40c, the fourth peripheral device 40d, the fifth peripheral device 40e, the sixth peripheral device 40f, the seventh peripheral device 40g and the eighth peripheral device 40h shown in the FIG. 1 are not distinguished with other peripheral device, they are simply referred to as "peripheral device 40".

Some peripheral devices 40 have a function to detect whether a person is in a room or nearby, that is detection devices. For example, in the example shown in the FIG. 1, a seventh peripheral device 40g includes a camera or a human sensor as the detection device. However, the peripheral devices 40 as the detection devices are not limited to cameras or human sensors, and other devices may have same function as the detection devices.

In this embodiment, the electric bed, which is the eighth peripheral device 40h, is arranged in a bedroom used by the first user when he sleeps or in a private room where the first user lives. As shown in the FIG. 1, the terminal device 20 and other peripheral devices 40 other than the eighth peripheral device 40h may also be arranged in the same room as the eighth peripheral device 40h. In this embodiment, we may call the room where the electric bed (the eighth peripheral device 40h) is arranged as "the room of the first user."

It should be noted that the control system 1 is not limited to the example shown in the FIG. 1, and we may modify this embodiment to omit some part of the configuration or to add another configuration. The same modification may be applied to other drawings, such as FIG. 14 such as, omitting some part of the configuration or adding other configurations.

Figure 2:
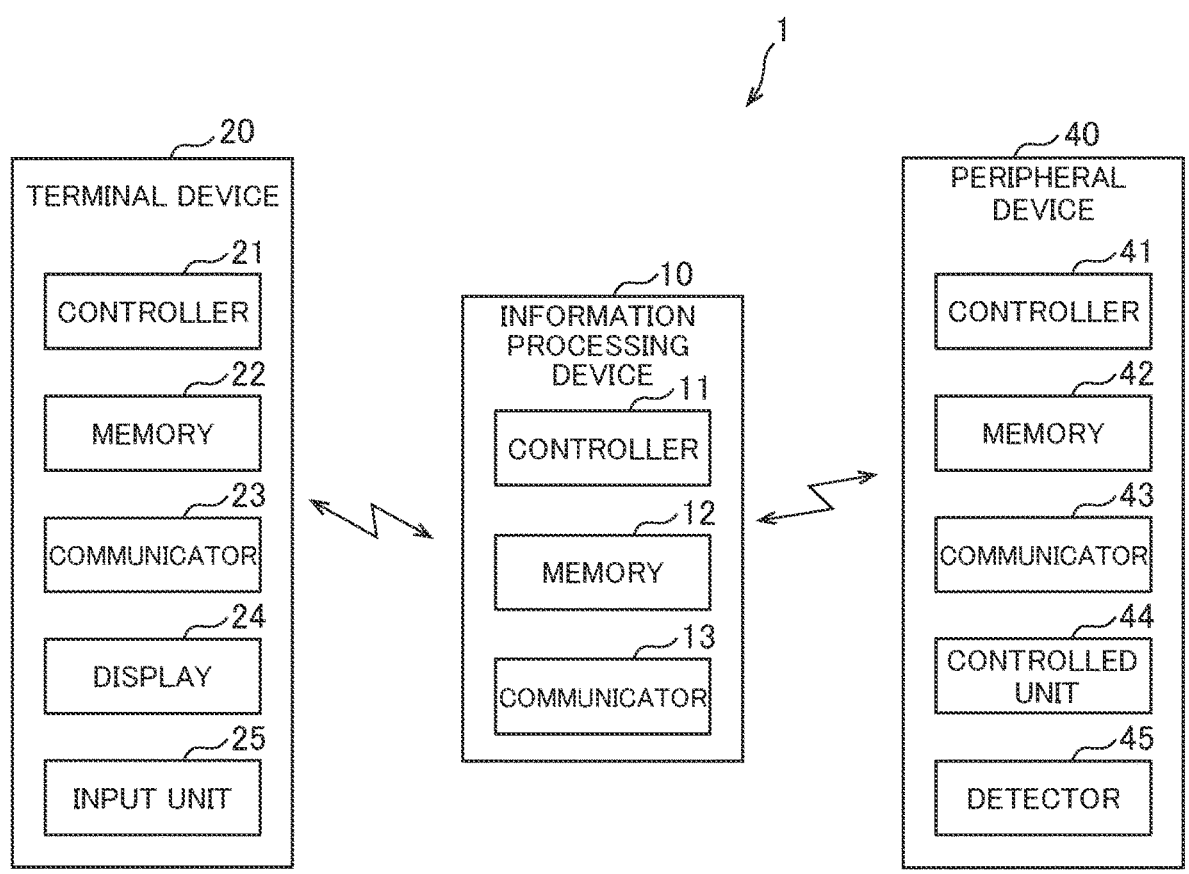
FIG. 2 is a functional block diagram of the control system of FIG. 1.

FIG. 2 is a functional block diagram of the control system 1 in the FIG. 1. However, in the FIG. 2, for the sake of brevity, the first peripheral device 40a to the eighth peripheral device 40h shown in the FIG. 1 are shown together as one functional part, "peripheral device 40." As shown in the FIG. 2, the control system 1 further includes an information processing device 10. The information processing device 10 can include, for example, a computer device or a server device. As shown in the FIG. 2, the information processing device 10 may be configured as an independent device, may be different from the terminal device 20 and the peripheral device 40. Alternatively, the information processing device 10 may be configured as an integral part of any of these devices by incorporating its functions into the terminal devices 20 or the peripheral devices 40. The information processing device 10 may be a cloud server or the like that performs the functions of the information processing device 10 described herein.

The information processing device 10 is electrically connected or communicable to the terminal device 20 and the peripheral device 40, respectively. For example, the information processing device 10 can be electrically connected or communicable to other devices by Bluetooth (registered trademark), infrared rays, NFC (Near Field Communication), wireless LAN (Local Area Network), wired LAN, WAN (Wide Area Network), Internet, etc. The communication method used between each of the terminal devices 20 and the peripheral devices 40 may be the same as a communication method of the information processing device 10 or different from the communication method of the information processing device 10.

The information processing device 10 receives various kinds of information from the terminal devices 20 and the peripheral devices 40. The information processing device 10 can cause the terminal devices 20 or the peripheral devices 40 to perform a prescribed information processing based on the received information and transmit a control signal to the terminal devices 20 or the peripheral devices 40.

As shown in the FIG. 2, the information processing device 10 includes a controller 11, a memory 12, and a communicator 13.

The controller 11 controls and manages the entire information processing device 10, including each component of the information processing device 10. In this embodiment, in particular, the information processing device 10 can assist the users by performing the computer program stored in the memory 12.

The controller 11 can include at least one of a circuit for processing digital signals and a circuit for processing analog signals as a hardware. For example, the controller 11 can include a hardware such as one or more circuit devices mounted on a circuit board or one or more circuit elements. One or more circuit devices are, for example, integrated circuits (ICs), field-programmable gate arrays (FPGAs), etc. One or more circuit elements are, for example, resistors, capacitors, etc.

The controller 11 may also include a processor. The information processing device 10 of this embodiment includes a memory for storing information and a processor operating on the basis of the information stored in the memory. The information includes, for example, computer programs and various kinds of data. The processor includes the hardware. It is possible to use a variety of processors such as CPU (Central Processing Unit), GPU (Graphics Processing Unit) and DSP (Digital Signal Processor). The memory may be a semiconductor memory such as SRAM (Static Random Access Memory), DRAM (Dynamic Random Access Memory), or flash memory, a register, a magnetic storage device such as a hard disk drive (HDD), or an optical storage device such as an optical disk device. For example, the memory stores computer programs related to instructions that can be read by a computer, and when the processor executes the instructions, the controller 11 perform an information processing operation corresponding to the read instruction. The instructions here may be instructions for a set of instructions that make up a computer program or instructions for operating the hardware circuitry of the processor.

In this embodiment, the controller 11 performs a prescribed information processing based on the information received from the terminal devices 20 and the peripheral devices 40, and transmits a control signal to the terminal devices 20 or the peripheral devices 40 to cause the terminal devices 20 or the peripheral devices 40 to perform a prescribed operation. The detailed examples of processing by the controller 11 will be described later.

The memory 12 is the work area of the controller 11 and includes various memories such as SRAM, DRAM, and ROM (Read-Only Memory). The memory 12 may store a computer program for performing the processing described herein.

In this embodiment, the memory 12 stores the control content to be performed by the terminal devices 20 or the peripheral devices 40. In this embodiment, although details will be described later, the information processing device 10 has four operation modes: called an "off-mode", a "standby mode", a "user mode" and a "care mode". The memory 12 stores the control contents to be performed by the terminal devices 20 or the peripheral devices 40 for each mode. For example, the memory 12 stores the control content to be performed by the peripheral devices 40 in association with each of the "off-mode", the "standby mode", the "user mode" and the "care mode". When multiple peripheral devices 40 exist, as in the present embodiment, the memory 12 may store the control content for each peripheral device 40 to support assistances for the assisted person by the caregiver. Also, in the present embodiment, the memory 12 may store control contents for each type of assistance assisted by the caregiver in association with the "care mode". In this embodiment, the types of assistance may be an excretion assistance, a meal assistance and a transferring or moving assistance. In each assistance, the memory 12 may store control contents in association with the stage of assistance or progress stage of the assistance.

The FIG. 3 shows an example of a table of control contents stored by the memory 12. Specifically, the FIG. 3 is an example of a table showing the control contents to be performed by the peripheral devices 40 when the information processing device 10 performs an information processing in the "care mode". In other words, the FIG. 3 is an example of a table showing the control content associated with the "care mode". Regarding the "care mode", the memory 12 stores the control contents of the peripheral devices 40 for supporting the assistance of the assisted person by the caregiver. For example, as shown in the table in the FIG. 3, the memory 12 stores control contents for each type of assistance (the excretion assistance, the meal assistance and the transferring or moving assistance). In addition, the memory 12 stores control contents in association with the stage of assistance or progress stage of the assistance. The example shown in the FIG. 3 shows three progress stages of the assistance: "before the assistance begins", "during the assistance" and "after the assistance is completed", but we do not have any intents to limit to the examples above, the progress stages may be divided into more detailed progress stages during the assistance. For example, each control content may be associated with a trigger information for performing the control content. The trigger information may be, for example, a predetermined signal received from the terminal devices 20 or the peripheral devices 40. Based on the signal received from the terminal devices 20 or the peripheral devices 40, the controller 11 determines the progress stage of the assistance, and sends a control signal to the peripheral devices 40 to perform the control content shown in the table in the FIG. 3 at each determined progress stage. In addition, each of the control contents shown in the FIG. 3 may actually be stored in association with a peripheral device 40 to perform the control contents.

In the FIG. 3, a table indicating the control content associated with the "care mode" is described, but the memory 12 similarly stores tables indicating the control content for the "off-mode", the "standby mode" and the "user mode", respectively. However, in the case of the "off-mode", the "standby mode" and the "user mode", the control contents may not be stored for each type of the assistance.

The communicator 13 is an interface for communication through a network and includes, for example, an antenna, an RF (radio frequency) circuit, and a baseband circuit. The communicator 13 may perform a processing according to an instruction from the controller 11 or may include a processor to perform a communicating processing which is different from the communicating processing of the controller 11. In this embodiment, the communicator 13 sends a control signal to the peripheral devices 40 to cause the specific control contents to be performed.

The terminal device 20 is, for example, a device such as a smartphone or tablet. The terminal device 20 may be another type device such as a PC (Personal Computer). The terminal device 20 is for example, a device owned by a user, that is, an assisted person or a caregiver. As shown in the FIG. 2, the terminal device 20 includes, a controller 21, a memory 22, a communicator 23, a display 24 and an input unit 25.

The controller 21 controls and manages the entire terminal device 20. The controller 21 can include at least one of a circuit for processing digital signals and a circuit for processing analog signals as hardware. For example, the controller 21 can include hardware such as one or more circuit devices mounted on a circuit board or one or more circuit elements. The controller 21 may be implemented by a processor. The processors can use a variety of processors, including CPUs, GPUs and DSPs.

The memory 22 is a work area of the controller 21 and include various memories such as SRAM, DRAM and ROM.

The communicator 23 is an interface for communication through a network and includes, for example, an antenna, an RF circuit, and a baseband circuit. The communicator 23 may perform a processing according to an instruction from the controller 21 or may include a processor to perform a communicating processing which is different from the communicating processing of the controller 21.

The display 24 is an interface for displaying various information and is a liquid crystal display or an organic EL display or any other type of display.

The input unit 25 performs a processing for accepting operation input by the user using the terminal devices 20. Alternatively, a touch sensor may be provided on the display 24 and the touch sensor provided on the display 24 may function as the input unit 25. In this embodiment, the touch sensor is provided in the display 24, and the touch sensor functions as the input unit 25.

The peripheral devices 40 may be any device used in the room of the first user. The peripheral devices 40 includes, for example, a television (television receiver), a camera, a human sensor, a lighting device, an air conditioner, an aroma diffuser, an audio device, an electric bed, etc. The peripheral devices 40, however, are not limited to the examples described above. The devices that can constitute the peripheral devices 40 are described in this specification with the description "as the peripheral devices 40" below.

As shown in the FIG. 2, the peripheral device 40 includes, as functional parts, a controller 41, a memory 42, a communicator 43, a controlled unit 44 (which may be a movable unit, we call the controlled unit and the movable unit as the "controlled unit" later) and a detector 45. Note that all peripheral devices 40 need not necessarily include all the functional units described above. The peripheral devices 40 may not include some of these functional units depending on the function of the peripheral devices 40. For example, the peripheral devices 40 may not include either the controlled unit 44 or the detector 45.

The controller 41 controls and manages the entire peripheral device 40. The controller 41 can include at least one of a circuit for processing digital signals and a circuit for processing analog signals as hardware. For example, the controller 41 can include the hardware such as one or more circuit devices mounted on a circuit board or one or more circuit elements. The controller 21 may be implemented by a processor. The processors can use a variety of processors, including CPUs, GPUs and DSPs.

The memory 42 is the work area of the controller 41 and is realized by various memories such as SRAM, DRAM, and ROM.

The communicator 43 is an interface for communication through a network and includes, for example, an antenna, an RF circuit, and a baseband circuit. The communicator 43 may perform an information processing according to an instruction from the controller 41 or may include a processor to perform a communicating processing which is different from the communicating processing of the controller 41.

The controlled unit 44 is a mechanism to perform the functions of the peripheral devices 40. The peripheral devices 40 may include a controlled unit 44 according to the function of the peripheral devices 40. For example, an air conditioner as a first peripheral device 40a has a heat exchanger and a compressor, etc., to perform a heating and cooling function as the controlled unit 44. For example, the aroma diffuser as the second peripheral device 40b has a mechanism for diffusing the aroma oil as the controlled unit 44. For example, a lighting device as a third peripheral device 40c has a light-emitting unit that emits light like a fluorescent lamp or a light bulb as the controlled unit 44. For example, a curtain as a fourth peripheral device 40d has a motor for opening and closing the curtain as the controlled unit 44. For example, an audio device as a fifth peripheral device 40e has a speaker that outputs sound as the controlled unit 44. For example, a blower as the sixth peripheral device 40f has a motor for rotating blades as the controlled unit 44. For example, an electric bed as the eighth peripheral device 40h has a number of bottoms as the controlled unit 44. For example, the electric bed in this specification is disclosed in PCT/JP2018/044703 patent application (Title: Electric furniture, International filing date: Dec. 5, 2018) as the controlled unit 44. The electric bed described in this application can be applied to this embodiment. This patent application is incorporated in its entirety by incorporation Even if the peripheral devices 40 may be other devices other than the devices listed above, the controlled unit 44 may be an appropriate mechanism. For example, when the peripheral device 40 is a television receiver, the controlled unit 44 may be a display to be configured to display video and a speaker to output sound.

A detector 45 detects whether a person is near the detector 45. The detector 45 can be configured with an appropriate detection mechanism. For example, when the seventh peripheral device 40g is a camera, the detector 45 includes an imaging unit to capture an image. For example, when the seventh peripheral device 40g is a human sensor, the detector 45 includes a proximity sensor capable of detecting whether or not a person is near the sensor. The seventh peripheral device 40g can also be configured by radio frequency identifier (RFID). When the seventh peripheral device 40g is an RFID reader, the detector 45 includes a reading unit to read the information of the RFID tag.

The information about the terminal devices 20 and the peripheral devices 40 is stored in advance in the memory 12 of the information processing device 10, for example. The FIG. 4 shows an example of a table of terminal devices 20 and the peripheral devices 40 stored in the memory 12. As shown in the FIG. 4, for example, (1) the device names of the terminal devices 20 or the peripheral devices 40, (2) the device identification information for uniquely identifying the terminal devices 20 or the peripheral devices 40, and (3) the room identification information for uniquely identifying the room of the first users who use the terminal devices 20 or the peripheral devices 40 are associated and stored in the memory 12, and thus the information related to the terminal devices 20 and the peripheral devices 40 are associated with the room of the first users. The information about the terminal devices 20 and the peripheral devices 40, that is, a table as shown in the FIG. 4, may be generated based on an input from, for example, users (including assisted person and caregivers), or an administrator of the control system 1, and may be stored in the memory 12.

1.2 Mode Transition

Next, the mode transition performed by the information processing device 10 will be described. In this embodiment, the information processing device 10 has four operation modes and performs an information processing in one of four modes. The four modes are the "off-mode", the "standby mode", the "user mode" and the "care mode". Details of each mode are described below.

Figure 5:
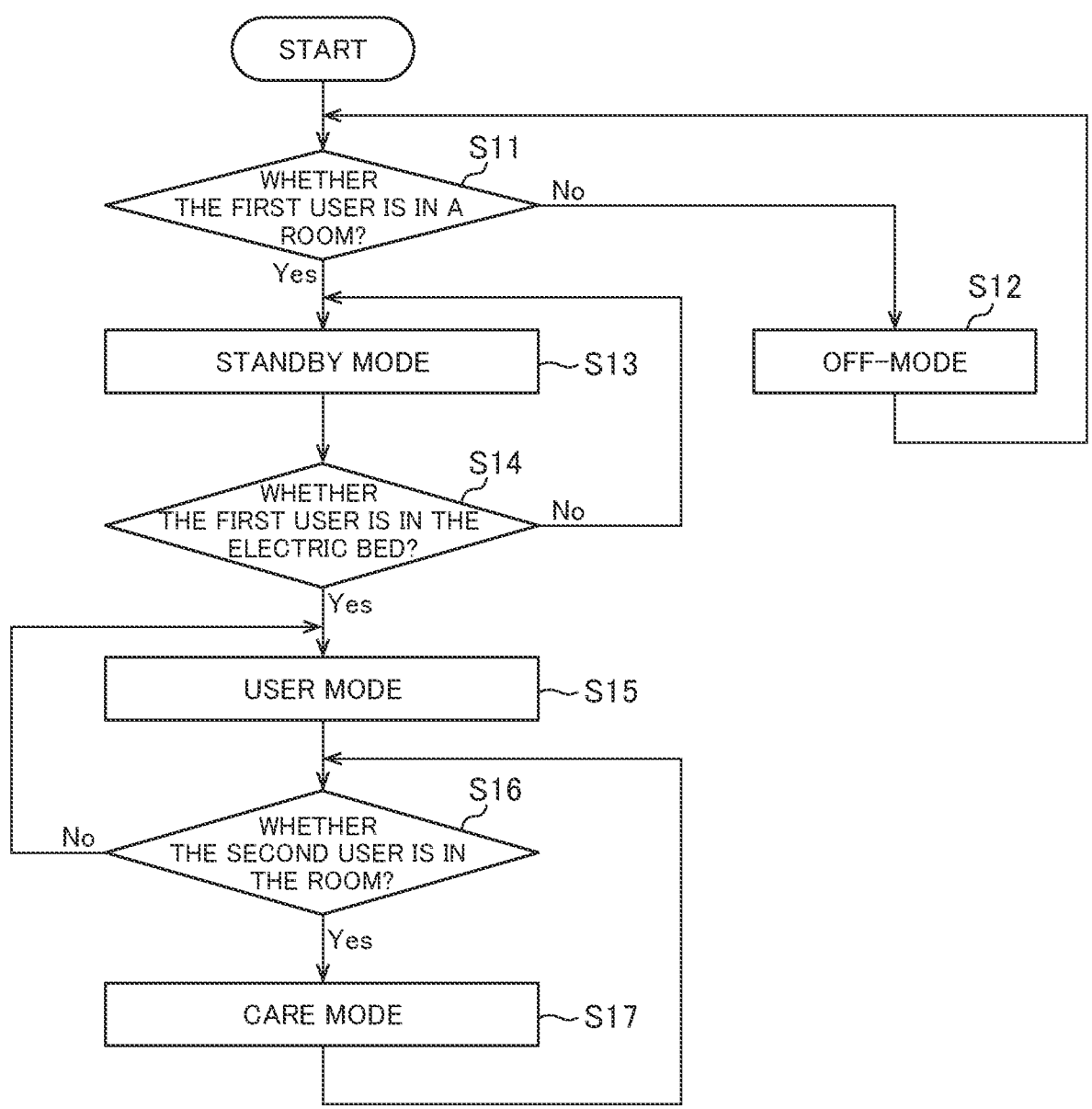
FIG. 5 is a flowchart illustrating an example of processing performed by an information processing device.

The FIG. 5 is a flowchart illustrating an example of processing performed by the information processing device 10. Specifically, the FIG. 5 is a flowchart showing an example of the processing of the mode transition by the information processing device 10. The controller 11 of the information processing device 10 performs the mode transition to select one of the four modes and transfer a first mode to a second mode which is different from the first mode. The controller 11 may select any two of four modes if the controlled terminal devices 20 and the controlled peripheral devices 40 are different at the two modes.

Firstly, the information processing device 10 determines whether a person is in the room of the first user (a step S11). The information processing device 10 can determine whether or not a person is in the room using the information received from a camera or a human sensor as, for example, the seventh peripheral device 40g.

When the information processing device 10 determines that no person is in the room of the first user (No in the step S11), the information processing device 10 transfers to the "off mode" (step S12). In this case, the information processing device 10 perform an information processing in the "off mode". The details of the information processing in "off-mode" are described below. While performing the information processing in the "off mode", the information processing device 10 continuously or periodically performs the step S11.

When the information processing device 10 determines that a person is in the room of the first user (Yes in the step S11), the information processing device 10 transfers to the "standby mode" (step S13). In this case, the information processing 10 perform an information processing in the "standby mode". The details of the information processing in "standby mode" are described below. While performing an information processing in the "standby mode", the information processing device 10 performs step S14, which will be described next.

When the information processing 10 perform an information processing in the "standby mode", the information processing device 10 determines whether or not the first user is in the bed (step S14). The information processing device 10 may determine whether or not the first user is in bed in various ways.

When the information processing device 10 determines that the first user is not in the bed (No in the step S14), the information processing device 10 continues an information processing in the "standby mode". The information processing device 10 continuously or periodically perform the step S14 during the "standby mode".

The information processing device 10 may also perform the step S11 while continuing the information processing in the "standby mode". That is, the information processing device 10 may determine whether or not a person is in the room of the first user while continuing the information processing in the "standby mode". When the information processing device 10 determines that no person is in the room of the first user, that is, when a person in the room of the first user exits from the room of the first user, the information processing device 10 may transfer the "standby mode" to the "off mode".

When the information processing device 10 determines that the first user is in bed (Yes in the step S14), the information processing device 10 perform the mode transition to transfer "standby mode" to the "user mode" (step S15). In this case, the information processing device 10 performs an information processing in the "user mode". The details of performing the information processing in the "user mode" are described below. While perform an information processing in the "user mode", the information processing device 10 performs the step S16 described below.

When the information processing device 10 performs an information processing in the "user mode", the information processing device 10 determines whether another person has entered the room of the first user. For example, the information processing device 10 determines whether another person is in the room of the first user (step S16). If the information processing device 10 detects that another person is in the room of the first user, the information processing device 10 determines that another person has entered the room of the first user. The information processing device 10 can determine whether another person is in the room of the first user using the seventh peripheral device 40g.

When information processing device 10 determined that no other person is in the room of the first user (No in the step S16), the information processing device 10 continues the information processing in the "user mode". The information processing device 10 continuously or periodically perform the step S16 during the "user mode".

The information processing device 10 may further perform the step S11 while performing the information processing in the "user mode". That is, the information processing device 10 may determine whether or not a person is in the room of the first user while performing the information processing in the "user mode". When the information processing device 10 determined that no person is in the room of the first user, that is, when a person in the room of the first user exits from the room of the first user, the information processing device 10 may transfer the "user mode" to the "off mode".

When the information processing device 10 determined that another person is in the room of the first user (Yes in the step S16), that is, when another person enters the room of the first user, the information processing device 10 transfers the "user mode" to the "care mode" (step S17). In this case, the information processing device 10 performs an information processing in the "care mode". The details of performing the information processing in the "care mode" are described below.

The information processing device 10 continues to perform the step S16 while performing the information processing in the "care mode". The information processing device 10 continues to perform the information processing in the "care mode" as long as the information processing device 10 determines that another person is present in the room of the first user (step S17), while the information processing device 10 transfer the "care mode" to the "user mode" when the information processing device 10 determines that another person is not present in the room of the first user, that is, when another person leaves the room of the first user (step S15).

Thus, in this embodiment, the information processing device 10 sets the mode to the "off mode" when no user is in the room of the first user, to the "standby mode" or the "user mode" when only the first user is in the room, and to the "care mode" when the second user is in the room in addition to the first user. For example, when only the first user is in the room, the information processing device 10 may set the mode to the "user mode" without dividing the "standby mode" and the "user mode", and these modes may be collectively referred to as "user mode".

Now, the step S11 in the FIG. 5 will be described in detail. For example, when the seventh peripheral device 40g includes a camera, the information processing device 10 acquires the information of the image taken by the camera via the communicator 13. The information processing device 10 may determine whether or not a person is in the room of the first user by analyzing the information in the acquired image. For example, when the information processing device 10 determines that a person exists as a result of the analysis of the acquired image, the information processing device 10 can determine that a person is present in the room of the first user. The method of determining whether a person is in a room is not limited to this example. For example, a camera as the seventh peripheral device 40g may determine whether a person is in the room of the first user by performing an image analysis. In this case, the information processing device 10 can recognize whether or not a person is in the room of the first user by acquiring the information of the determination result from the camera.

When the seventh peripheral device 40g may be a human sensor, the information processing device 10 can determine whether or not a person is in the room based on the detection status by the human sensor.

In this embodiment, the information processing device 10 can recognize a person as the first user when the information processing device 10 detected that the person is in the room of the first user. That is, when only one person is in the room of the first user, the information processing device 10 recognizes the person as the first user. However, if the information processing device 10 can identify the person staying in the room of the first user by a separate way, it is not necessary to recognize the person staying in the room of the first user as the first user. For example, the information processing device 10 can identify whether the person staying in the room is the first user or not by performing image analysis (face authentication) on the image taken by the camera as the seventh peripheral device 40g. Even if one person is in the room of the first user, it may not be the first user, such as a cleaning staff, and such image analysis can accurately identify whether the person in the room is the first user or not.

Even when the seventh peripheral device 40g includes an RFID reader, the information processing device 10 does not necessarily need to recognize one person in the room of the first user as the first user. That is, the RFID reader reads the RFID tag carried by the person entering the room of the first user. The RFID tag stores information that can uniquely identify the user, and the memory 12 of the information processing device 10 stores the information stored in the RFID tag together with information associated with the user. When the RFID reader reads the RFID tag, the information processing device 10 refers to the information stored in the memory 12 and identifies the user who entered the room of the first user from the information read by the RFID reader. As the result of this, the information processing device 10 specifies whether the user entering the room is the first user, the second user, or some other person.

Next, details of the method for determining whether or not the first user is in bed, which is performed in the step S14, are described below. For example, the information processing device 10 can determine whether or not the user is in bed based on the information of the image taken by the camera as the seventh peripheral device 40g.

The information processing device 10 may determine whether or not the user is in the bed based on information detected by a user state detector installed in the electric bed as the eighth peripheral device 40h, or information such as a weighting sensor installed in the electric bed or a pressure sensor installed in the mattress, without being limited to the information of the image taken by the camera.

Here, the user state detection device is a device for detecting the biological information of the first user, and is arranged, for example, between the bottom of an electric bed and the mattress on the electric bed. The user state detection device can detect the first user's state, that is a state "getting out of the electric bed", a state "the person is in the electric bed", a state of the "position" of the first user in the electric bed, or a state of the "posture" of the first user, by detecting biological information of the first user. As a method of detecting the first user's state, for example, the method of detecting the first user's state described in Japanese Patent Application No. 2002-327624 (Title: in and out detector, Application date: Nov. 11, 2002), the method of detecting described in Japanese Patent Application No. 2002-327632 (Title: Displacement detector on the bed, Application date: Nov. 11, 2002), and the method of detecting described in Japanese Patent Application No. 2002-327633 (Title: Position Detector on the Bed, Application Date: Nov. 11, 2002) can be applied. These patent applications are incorporated in their entirety by incorporation.

The information processing device 10 may determine that the first user is on the bed when a sleep entry button provided on an input device of the electric bed is pressed or when the information processing device 10 detects that the first user falls asleep by the user condition detection device, for example, the electric bed described in Japanese Patent Application No. 2018-227422 (Title: Electric furniture, Application date: Dec. 4, 2018) can be applied to the electric bed of this embodiment. This patent application is incorporated in its entirety by incorporation.

Next, a method of determining whether another person is in the room, which is performed in the step S16, is described below. The information processing device 10 determines whether or not more than one person is in the room of the first user by analyzing the information of the image taken by the camera as, for example, the seventh peripheral device 40g. When more than one person is in the room as a result of the analysis of the acquired image, the information processing device 10 can determine that another person is in the room of the first user. As in the step S11, the camera as the seventh peripheral device 40g may determine whether or not more than one person is in the room.

In the present embodiment, when the information processing device 10 detects that another person has entered the room of the first user while recognizing that the first user is in the room of the first user, the information processing device 10 can recognize the other person as the second user. That is, when the information processing device 10 recognizes one person as the first user by the fact that only one person is in the room of the first user and detects that another person has entered the room, the other person is recognized as the second user. However, the information processing device 10 may determine by a separate way whether the person who enters the room of the first user is the second user. For example, the information processing device 10 can identify whether the person entering the room is the second user or not by analyzing the image taken by the camera as a detection device. Alternatively, the information processing device 10 can identify whether the person entering the room is the second user or not by reading the information of the RFID tag.

In this embodiment, we have explained the mode transitions with reference to the FIG. 5. However, the information processing device 10 can perform the mode transition explained above, and the information processing device 10 does not necessarily have to perform the mode transition. If the information processing device 10 detects that the caregiver has entered the room of the first user when the assisted person (the first user) is in the room of the first user, as in Yes in the step S16, the information processing device 10 may perform the information processing in the "care mode" described later. Therefore, it should be understood that each mode in the mode transition described here is an example described for convenience.

The information processing device 10 performs a specific processing in each of the "standby mode", the "off mode", the "user mode" and the "care mode". In each mode, the information processing device 10 makes the peripheral devices 40 perform different processing. For example, the information processing device 10 stores in the memory 12 a table in which each of the above 4 modes is associated with the processing content to be performed by the peripheral devices 40. The information processing device 10 can refer to the table and perform the specific processing for the peripheral devices 40 corresponding to the performed mode.

1.3 Details of Control Operation Associated With Mode Transitions

Here, we will explain the details of the control operation performed by the information processing device 10 in the "off mode", the "standby mode", the "user mode" and the "care mode". The FIG. 6 is a timing chart showing the control flow performed by the information processing device 10 in each mode.

The FIG. 6 shows changes over time in the state of the first user, the mode of the information processing device 10, and the operating state of the peripheral devices 40. The FIG. 6 shows a camera, a first lighting device, a second lighting device, a television, an audio device, an electric bed, a mattress, an aroma diffuser, an air conditioner, an air purifier, a curtain, a coffee maker, an oven and a door, as the peripheral devices 40. The first lighting device is the lighting device installed on the ceiling and the second lighting device is the lighting device installed on the electric bed at the foot side location. The second lighting device may be installed on another device. A mattress is an air mattress that is placed on the electric bed and configured to change an internal pressure, for example, by adjusting the amount of air in the air mattress. The door is a motorized door provided at the entrance to the room of the first user.

As shown in the FIG. 6, when the first user is not in the room of the first user, there is no user in the room of the first user. In this case, the information processing device 10 sets the mode to the "off mode". The "off mode" is the mode when the control system 1 turns off all function of the control system 1 except for a certain function. In the "off-mode", the information processing device 10 makes the peripheral devices 40 perform the control contents stored in the memory 12 in association with the "off-mode". For example, in the "off mode", based on the control signal of the information processing device 10, the information processing device 10 continues to turn on the camera that acquires information for determining the presence of the first user, and turn off all other peripheral devices 40. The human sensor may be used instead of the camera.

Next, we assume that the first user enters the room of the first user. In other words, the first user is in the room. In this case, the information processing device 10 sets the mode to the "standby mode". The "standby mode" is when one person is in the room of the first user. In this embodiment, the "standby mode" is a mode in which one person is in the room of the first user and the one person is not in the electric bed. In the case of the "standby mode", the information processing device 10 causes the peripheral devices 40 to perform the control contents stored in the memory 12 in association with the "standby mode". Specifically, when the information processing device 10 transfers to the "standby mode" from the "off mode" for example, the information processing device 10 transmits a control signal for performing the operation to the specific peripheral devices 40. Upon receiving the control signal, the peripheral devices 40 perform prescribed operations.

For example, as shown in the FIG. 6, the first and second lighting devices are turned on. In addition, the television, audio devices, aroma diffusers, air conditioners and air purifiers are turned on. At this time, the information processing device 10 may transmit a control signal to operate the air conditioner at a set temperature and air volume comfortable to the first user, based on the information such as temperature and humidity acquired from the outside, for example. The set temperature and air volume comfortable to the first user may be set in advance, or may be learned based on past operating conditions of the air conditioner. The information processing device 10 may calculate appropriately the temperature and the air volume comfortable to the first user using a prescribed algorithm. This makes it easier and comfortable for first user to live in the first user's room.

Also, when the curtain is placed in the "standby mode", the curtain is turned on and operated to open or close. The method how to control the curtain is determined, for example, by the time of day. For example, the curtain is controlled to close during the evening and early morning hours, while curtains is controlled to open during the morning and early evening hours. The door is also turned on and closed. In addition, the electric bed and mattress are turned on. The information processing device 10 makes the electric bed and mattress detectable whether or not the first user has entered the bed or the first user is in the electric bed.

Next, we assume that the first user gets in the electric bed. In this case, the information processing device 10 sets the mode to the "user mode". The "user mode" is a mode in which one person is in the room of the first user. In this embodiment, the "user mode" is a mode in which one person is in the room of the first user and the first user gets in the electric bed. In the "user mode", the information processing device 10 can perform different control processing depending on detecting whether the first user has an intention to sleep. The information processing device 10 determines whether the first user has an intention to sleep using the time information for example. We will explain how to determine whether the first user has an intention to sleep using the time information in detail below. The information processing device 10 acquires the current time based on time information obtained using an internal real-time clock or time information acquired from an external device. The information processing device 10 may determine whether the first user has an intention to sleep when the current time is within a predetermined time range and the first user actually gets in bed. The predetermined time range indicates the time range which the first user normally gets in the electric bed and may be set as appropriate by the first user, the second user, or the administrator of the control system 1. The predetermined time range may be set, for example, between 21:00 and 25:00. If the current time is out of the predetermined time range, the information processing device 10 can determine that the first user has no intention to sleep. It should be noted that, without limitation, the information processing device 10 may determine that the first user has an intention to sleep when a sleep entry button provided on an input device of the electric bed is pressed or when the information processing device 10 detects that the first user falls asleep by the user condition detection device.

In the example shown in the FIG. 6, we now assumed that information processing device 10 had determined that the first user had the intention to sleep. For example, suppose the information processing device 10 detects that the first user falls asleep by the user condition detection device. As a result, the information processing device 10 performs the mode transition to set the mode to the "user mode", the information processing device 10 makes the peripheral devices 40 perform the control contents stored in the memory 12 in association with the "user mode". For example, the environment of the room of the first user is controlled so that the sleep quality of the first user is easily improved. For example, as shown in the FIG. 6, the illuminances of the first and second lighting devices gradually become darker. In addition, the television and audio devices are turned off, and the temperature setting of the air conditioner is gradually lowered. The electric bed is also gradually lowered or a back bottom of the electric bed is gradually lowered so that surfaces of the bottoms are flat in the entire electric bed.

Then we assume that the first user goes into a REM sleep state. Whether the sleep state of the first user is the REM sleep state or a non-REM sleep state can be determined based on biological information of the first user. Even in the REM sleep state, the information processing device 10 maintains the "user mode". In this case, the illuminances of the first and second lighting devices are turned off. Also, the aroma diffuser is turned off. The electric bed will also be fully flat. The mattress remains to turn on, but the internal pressure is controlled to make it easier for the first user to improve the quality of sleep. The sleep quality of the first user may be calculated as a sleep score indicating sleep quality based on, for example, the sleep state of the first user in the past. For the sleep score, for example, the sleep score described in Japanese Patent Application No. 2020-175602 (Title: Electric bed system and application software, application date: 2020, October 19) can be applied to this embodiment. This patent application is incorporated in its entirety by incorporation. The mattress controls the internal pressure to set the internal pressure when the sleep score of the first user is high. The air-conditioner's temperature settings will continue to be gradually lowered.

Suppose the first user goes into the non-REM sleep state. Even in the non-REM sleep state, information processing device 10 maintains the "user mode" In this case, the back bottom of the electric bed is raising to around a 10 degree angle. The air-conditioner's temperature settings will continue to be gradually lowered.

Next, we assume that the second user enters the room of the first user. In this case, the information processing device 10 performs the mode transition to set the mode to the "care mode". In the case of the "care mode", the information processing device 10 causes the peripheral devices 40 to perform the control contents stored in the memory 12 in association with the "care mode". Here, in the case of the "care mode", the information processing device 10 identifies the type of the assistance (care assistance). For example, the information processing device 10 determines whether the type of the assistance is an excretion assistance, a meal assistance or a transferring or moving assistance. More details on how to identify the type of care will be described as follow. First of all, we assume that the information processing device 10 specifies that the type of the assistance is the excretion assistance. When the information processing device 10 identifies that the type of the assistance is the excretion assistance, for example, referring to the table shown in the FIG. 3, the information processing device 10 controls the peripheral devices 40 according to the progress stage of the excretion assistance.

In the example shown in the FIG. 6, when the caregiver performs the excretion assistance in the "care mode", the second lighting device is turned on while the first lighting maintains to turn off. This indicates keeping the ceiling lighting device off and turning on the lighting device located at a feet side. Thus, it is possible to secure the brightness necessary for the second user to perform the excretion assistance and not to disturb the sleep of the first user. The electric bed is also fully flat and adjusted in height after the second lighting device is turned on. The electric bed may be adjusted in height at the same time that the second lighting device is turned on. The electric bed adjusts the height of the electric bed so that the second user can easily perform a task to change the diaper of the first user. The mattress also adjusts the internal pressure to make it easier for the first user to be in a lateral position. In addition, the air conditioner raises the temperature to be set. This makes the first user not to feel cold during the task to change the diaper of the first user. The air purifier also increases the operating strength. This makes it easier to quickly deodorize odors that can occur during the task to change the diaper of the first user.

When the excretion assistance is completed by the second user, the second user exits the room of the first user. The information processing device 10 performs the mode transition from the "care mode" to the "user mode". In the example shown in the FIG. 6, we assumed that the first user is in a non-REM sleep state at this time. In this case, the second lighting device is turned off again. The back bottom of the electric bed is raising to a 10 degree angle. The temperature setting of the air conditioner is returned once in the previous "user mode" or gradually returned to the temperature setting in the previous "user mode", and then gradually increased toward a time to wake up. The internal pressure of the mattress is controlled so that to make it easier for the first user to improve sleep quality. The air purifiers return operating intensity to normal intensity. It should be noted that these controls may be performed immediately after the task is completed before the information processing device 10 performs the mode transition to the "user mode" (a current mode is the "care mode").

Then we assumed the first user goes into the REM sleep state again. Even in the REM sleep state, the information processing device 10 maintains the "user mode". In this case, the electric bed would be fully flat. The air-conditioner's temperature settings will continue to be gradually increased.

Then, in the morning, we assume that the first user wakes up. The information processing device 10 determines whether the first user wakes up based on biological information of the first user. Even when the first user wakes up, the information processing device 10 maintains the "user mode" if the first user is still in the electric bed. However, when the user wakes up, since the first user do not have any intention to sleep, the control processing when the first user do not have any intention to sleep is different from the control processing when the first user has the intention to sleep.

For example, as shown in the FIG. 6, the first and second lighting devices are turned on. Also, the television, the audio devices and the aroma diffusers will be turned on. Also, the curtain is operated to open. In addition, the coffee maker and oven are turned on. This will make breakfast preparation a smooth processing. Also, the back bottom of the electric beds is raising. The air of the back section inside the mattress is released. This allows the first user to transfer from a supine position to a sitting position. As shown in the FIG. 6, the coffee maker and oven will turn off after the user used the coffee maker and the oven.

Next, we assume that the second user enters the room of the first user. In this case, the information processing device 10 performs the mode transition from the "user mode" to the "care mode". Here, it is assumed that the information processing device 10 has identified that the type of the assistance is the transferring or moving assistance. When the information processing device 10 identifies that the type of the assistance is the transferring or moving assistance, for example, referring to the table shown in the FIG. 3, the information processing device 10 controls the peripheral devices 40 according to the progress stage of the assistance.

For example, a door is opened. This makes it easier for the first user to exit. Also, the television and the audio devices are turned off. There is no need to use the television and the audio devices when the transferring or moving assistance is performed since the first user is leaving from the room of the first user. Also, at a prescribed times, the air conditioner is turn off. This is because there is no need to use the air conditioner in the same reason.

When the first user and the second user leave from the room of the first user, the information processing device 10 performs the mode transition from the "care mode" to the "off mode". In this case, the first and second lighting devices are turned off. In addition, the electric bed and the mattress are turned off. The Aroma diffusers and air purifiers are also turned off. The curtains are turn off and left open. The door will be closed and turned off.

In this way, the information processing device 10 performs the mode transition from the first mode to the second mode, and performs the information processing to control of the peripheral devices 40 in each mode.

As explained with the reference to the FIG. 6, some of the peripheral devices 40 continue to be controlled in a same way even when the information processing device 10 performs the mode transition from the "user mode" to the "care mode". For example, the first lighting device remains an off state even when the information processing device 10 performs the mode transition from the "user mode" to the "care mode" (the "care mode" of the excretion assistance in the example of the FIG. 6). This makes it less likely to disturb the first user's sleep.

In addition, as explained with the reference to the FIG. 6, some of the peripheral devices 40 are controlled in a different way, that is, control contents of the peripheral devices 40 are changed, when the information processing device 10 performs the mode transition from the "user mode" to the "care mode" (the "care mode" of the excretion assistance in the example of the FIG. 6). For example, the internal pressure of the mattress will be changed or adjusted so that the first user is likely to be in a lateral position because the quality of sleep of the first user is likely to improve when the information processing device 10 performs the mode transition from the "user mode" to the "care mode" of the excretion assistance. This makes it easier for the excretion assistance to be performed by the second user.

Also, as explained with the reference to the FIG. 6, some of the peripheral devices 40 switch between an activated state and the non-activated state when the information processing device 10 performs the mode transition from the "user mode" to the "care mode" (the "care mode" of the excretion assistance in the example of the FIG. 6). For example, the second lighting device is turned on in the "care mode" from being turned off in the "user mode". This makes it easier for the assistance to be performed by the second user.

However, the timing chart in the FIG. 6 is only an example. Therefore, the peripheral devices 40 other than the peripheral devices 40 shown in the FIG. 6 may perform an appropriate control processing. In addition, the control processing of the peripheral device 40 is not limited to that shown in the FIG. 6. Furthermore, even in the case of "care mode" other than the excretion assistance, the peripheral devices 40 may be controlled appropriately.

In each mode, the first user may directly control the peripheral devices 40 by operating the terminal device 20. That is, the first user may use the terminal devices 20 to perform the information processing to cause the peripheral devices 40 to perform a prescribed control processing. In this case, the control processing based on the operation input to the terminal devices 20 is preferentially performed over the control processing described using the FIG. 6.

In addition, the first user may make the operation inputs to the input interface provided on the peripheral devices 40. For example, the first user may directly control on-off switching operation input to the peripheral devices 40. Again, the control processing based on the operation input to the peripheral devices 40 is preferentially performed over the control processing described using the FIG. 6.

1.4 Identifying the Type of the Assistance

Next, we will explain an example of a method to identify the type of the assistance. As described above, in this embodiment, the types of the assistance include an excretion assistance, a meal assistance, and a transferring or moving assistance. The information processing device 10 identifies the type of the assistance when the information processing device 10 performs the mode transition to the "care mode".

The types of the assistance can be identified in a variety of ways. For example, the information processing device 10 can identify the type of the assistance that the second user intends to perform based on the tools (hereafter also simply referred to as "tools of the assistance") used in the assistance. The second user usually brings the tools of the assistance when the second user enters the room of the first user. Therefore the information processing device 10 identifies the type or kind of the tools of the assistance and determines the type of the assistance. Specifically, for example, an RFID tag is attached to a tool of the assistance, and the information stored in the RFID tag is read by an RFID reader in the room of the first user, and the type of the assistance may be identified based on the read information. At this time, for example, the information stored in each RFID tag and the type of the assistance are correspondingly stored in the memory 12, and the information processing device 10 may specify the type of the assistance by referring to the information in the memory 12. Alternatively, for example, the information processing device 10 sends a request signal through the gateway to the surrounding tools requesting the information to identify the type of the assistance. The information for identifying the type of the assistance is, for example, a tool status information, an ID information and a tool type information, which is stored in a communication device attached to the tool of the assistance in advance. When each communication device attached to the tool of the assistance receives a request signal from the information processing device 10, each communication device sends an answer signal including the information for identifying the type of the assistance as a response signal to the request signal. The information processing device 10 can identify the type of the assistance based on the information in the response signal. At this time, for example, the memory 12 stores the information for identifying the type of the assistance stored in each communication device in association with the type of the assistance, and the information processing device 10 may identify the type of the assistance by referring to the information in the memory 12.

Specifically, for example, the RFID tags are attached to the diapers or the diaper carts for the excretion assistance, the trays or dishes for the meal assistance, and wheelchairs for the transferring or moving assistance. Each RFID tag stores the identification information that can uniquely identify the RFID tag. Each RFID tag may store the information about the tool of the assistance to which the RFID tag is attached and the information about the type of the assistance in which the tool of the assistance is used.

The room of the first user is equipped with an RFID reader that can contactlessly read the information of the RFID tag. The RFID reader may be placed at any location where the information of the RFID tag can be read when the second user brings the tool of the assistance attached with the RFID tag into the room of the first user. For example, the RFID reader may be attached to the electric bed or the RFID reader may be located near the entrance to the room of the first user.

When providing the assistance, the second user brings the necessary tools of the assistance into the room of the first user according to the type of the assistance. For example, in the case of the excretion assistance (e.g., changing diapers), the second user brings a diaper cart into the room of the first user. For example, when providing the meal assistance, the second user brings the dishes and trays on which the meals are served into the room of the first user. For example, in the case of the transferring or moving assistance, the second user brings the wheelchair into the room of the first user.

Based on the identification information of the RFID tag acquired from the RFID reader, the controller 11 of the information processing device 10 can identify the type of the assistance by referring to the information stored in the memory 12. For example, if the identification of the acquired RFID tag corresponds to the identification information of the RFID tag attached to a diaper or diaper cart, the controller 11 specifies that the type of the assistance is the excretion assistance. For example, if the identification information of the acquired RFID tag corresponds to that of an RFID tag attached to the dishes or the tray, the controller 11 identifies the type of the assistance as the meal assistance. For example, if the identification information of the acquired RFID tag corresponds to that of an RFID tag attached to a wheelchair, the controller 11 identifies the type of the assistance as the transferring or moving assistance.

In the above example, it is explained that the memory 12 stores the identification information of each RFID tag in association with the type of the assistance. However, the memory 12 may store, for example, the identification information of each RFID tag in association with the information of the tool of the assistance to which the RFID tag is attached. In this case, the controller 11 can acquire the information of the tool of assistance corresponding to the identification information by referring to the memory 12 using the identification information acquired from the RFID reader. The controller 11 may specify the type of the assistance based on the information of the tool of the assistance. For example, the memory 12 stores the information of the tool of the assistance in association with the type of the assistance, and the controller 11 can specify the type of the assistance by referring to the information in the memory 12.

The RFID tag is not limited to attach the tools of the assistance described above, but may be attached to any other tools used in the assistance. For example, an RFID tag may be attached to a meal cart for use with the meals. For example, an RFID tag may be attached to a lift used during transferring.

And the type of the assistance need not necessarily be identified using RFID tags. For example, a sensor capable of reading a prescribed signal may be placed in the room of the first user, and each tool of the assistance may be attached with a signal output circuit that emits a signal readable by the sensor. In this case, the sensor transmits the information about the received signal to the information processing device 10, and the information processing device 10 can identify the type of the assistance based on the signal received from the sensor. Alternatively, for example, the information processing device 10 may acquire images taken by the camera as the peripheral devices 40, identify the tools of the assistance held by the second user by performing image analysis, and identify the type of the assistance based on the identified tools.

The type of the assistance may be specified in other ways. For example, if the user condition detection device 200 or the camera detects that the first user takes a sitting action when the first user is waking up, the controller 11 may specify that the type of the assistance is the transferring or moving assistance.

1.5 Controls by Type of Care

Once the type of the assistance is specified, the controller 11 of the information processing device 10 performs the control processing according to the specified type of the assistance. Here, a specific control processing is explained for each type of the assistance.

1.5.1 Control Content for the Excretion Assistance

Figure 7:
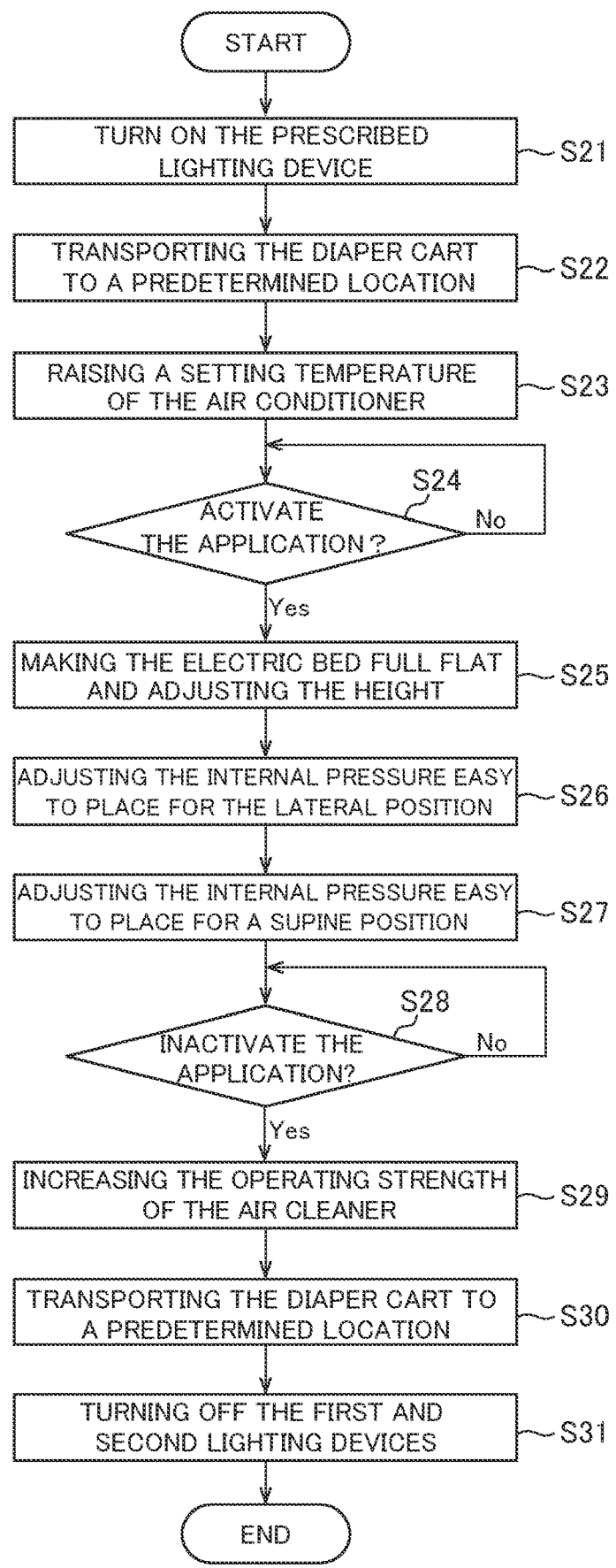
FIG. 7 is a flowchart showing an example of processing performed by an information processing device with an excretion assistance in a care mode

The FIG. 7 is a flowchart showing an example of the processing performed by the information processing device 10 in the "care mode" of the excretion assistance. The information processing device 10 performs the flow of the FIG. 7 based on the table shown in the FIG. 3, for example, when the information processing device 10 performs the mode transition to the "care mode" and identifies the type of the assistance as the excretion assistance.

When the type of the assistance is identified as the excretion assistance, the controller 11 of the information processing device 10 controls the peripheral devices 40 before starting the excretion assistance. For example, the controller 11 turns on a second lighting device (a lighting device placed at the foot side) (step S21). The controller 11 controls the diaper cart as the peripheral devices 40 so as to automatically transport to a predetermined location (step S22). The predetermined location is a location where the second user can easily perform the excretion assistance when changing the first user's diaper, that is, a location next to the electric bed, for example. The diaper cart may be, for example, what the second user brought when the second user enters into the room of the first user, or what has been placed in the room of the first user in advance. The diaper cart is a self-moving cart driven by a motor, and is configured so that the location of the diaper cart in the room can be grasped using a sensor provided in the diaper cart. It is convenient for the second user that the diaper cart automatically moves into a certain place. In addition, the controller 11 raises the set temperature of the air conditioner (step S23).

Next, the controller 11 determines whether or not the application software (hereinafter simply referred to as an "application") supporting the specific assistance has been activated (step S24). The application is installed in a terminal device (hereinafter simply referred to as "second user terminal device") used by the second user, such as a smartphone or tablet, for example, and the second user activates this application on the second user terminal device. The second user terminal device may be used with, for example, mixed reality (MR) glasses. In this case, the second user can assist the assistance while referring to the information displayed on the MR glasses by the application, for example, while wearing the MR glasses on the head. In this embodiment, the second user terminal device can be handled as a peripheral device 40.

The application that supports the assistance, for example, provides instructions to the second user about the tasks performed by the skilled caregiver's "hunch" or "tacit knowledge" so that the appropriate assistance can be provided regardless of the second user's skill level by digitizing the said "hunch" or "tacit knowledge". The application can, for example, construct a learned model by performing machine learning based on the training data, and provide instructions to the second user by displaying instructions corresponding to the contents of the assistance on the display screen of the second user terminal device or MR glasses based on the learned model. As a system using the application to support the assistance, for example, the system described in Japanese Patent Application No. 2021-032143 (Title: The information processing device and method, filing date: Mar. 1, 2022) can be utilized. This patent application is incorporated in its entirety by incorporation.

The controller 11 can determine that the application has been activated by receiving a notification from the second user terminal device that the application has been activated. When the controller 11 determines that the application has been activated (Yes in the step S24), the controller 11 controls the peripheral devices 40 during performing the assistance. For example, the controller 11 makes the electric bed full flat and adjusts the height to a height that is easy for the second user to assist (step S25). In addition, the controller 11 adjusts the internal pressure of the mattress to facilitate the lateral position (step S26).

At this time, when the application is activated, the instructions for a specific assistance are displayed on the display screen of the second user terminal device or MR glasses. For example, the second user terminal device displays the instructions for changing the first user's diaper on the display screen. For example, the second user terminal device causes the display screen to display the predetermined position where the diaper should be placed in the body of the first user. The second user terminal device detects whether the diaper is placed in a predetermined position. The second user terminal device can, for example, take an image of the body of the first user by a camera provided in the second user terminal device, and determine from the image whether the diaper has been placed at a predetermined position on the body of the first user. Alternatively, the second user terminal device may detect that the diaper is placed in a predetermined position on the body of the first user by operation input from the second user.

When the controller 11 of the information processing device 10 receives the information from the second user terminal device indicating that the diaper has been placed in a predetermined position on the body of the first user, the controller 11 adjusts the mattress to a predetermined internal pressure that makes it easier to place the first user in a supine position (step S27). This makes it easier for the second user to place the first user's posture in the supine position when the diaper is placed in a predetermined position on the first user's body for changing the first user's diaper, thereby making it easier for the subsequent tasks of changing the first user's diaper, When the second user completes the tasks of changing the first user's diaper, the second user operates the second user terminal device to exit this application. The controller 11 determines whether or not the application has been inactivated (step S28). For example, when the second user terminal device terminates or inactivates the application, the second user terminal device sends a notification indicating that the application has been inactivated to the information processing device 10, and the controller 11 can determine the application has been inactivated based on the notification received from the second user terminal device.

When the controller 11 determines the application has been inactivated (Yes in the step S28), the controller 11 controls the peripheral devices 40 after the completion of the assistance. For example, the controller 11 increases the operating strength of the air cleaner as the peripheral device 40 (step S29). The controller 11 automatically transports the diaper cart as the peripheral device 40 to a predetermined location (step S30). The predetermined location may be, for example, a location that had been placed before the second user had used the diaper cart to change the first user's diaper. When the room of the first user is, for example, a room where several assisted person live, and the second user performs the excretion assistance to change the first user's diaper for several assisted person, the predetermined location is a location where the second user can easily perform the excretion assistance to change the next first user's diaper, and may be, for example, next to the bed of the next first user, thus it is pretty convenient for the second user that the diaper cart automatically moves into a certain place. The controller 11 also turns off the first and second lighting devices (step S31). The controller 11 may perform the mode transition from the "care mode" to the "user mode" when the second user exits the room of the first user.

1.5.2 Control Content in the Meal Assistance

Figure 8:
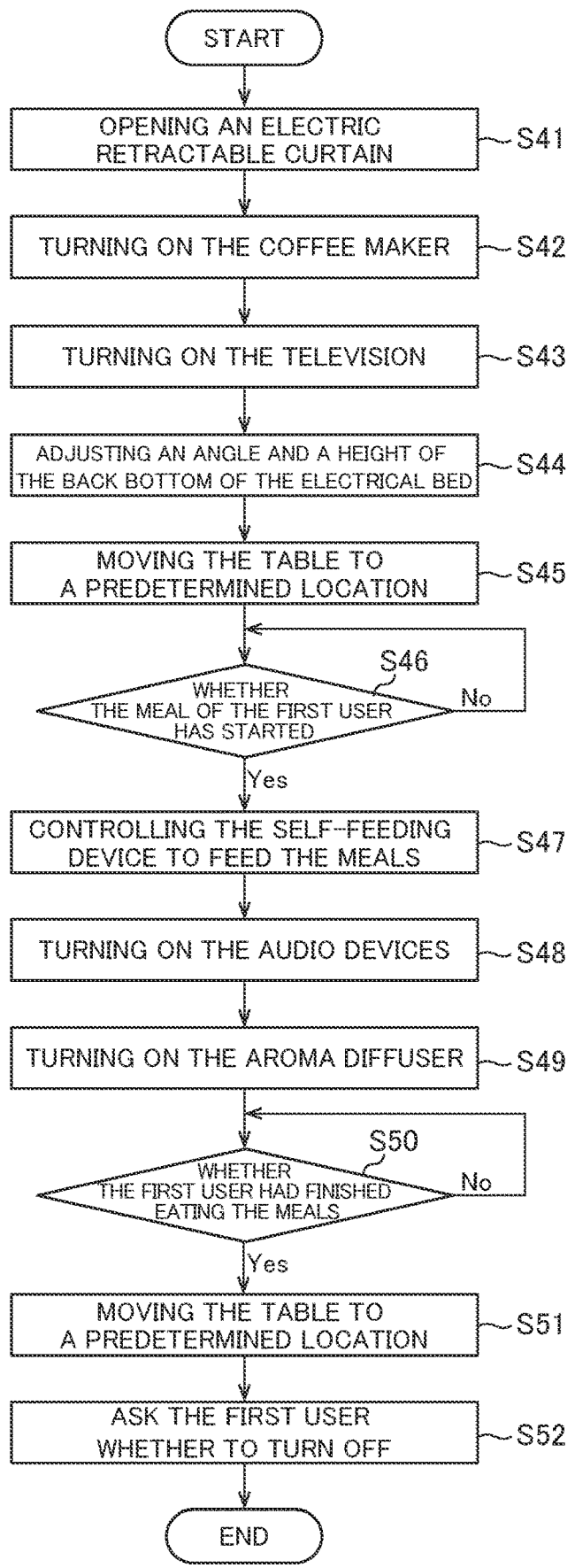
FIG. 8 is a flowchart showing an example of processing performed by an information processing device with a meal assistance in the care mode

The FIG. 8 is a flowchart showing an example of the processing performed by the information processing device 10 with the meal assistance in the "care mode". The information processing device 10 performs the flow of the FIG. 8 based on the table shown in the FIG. 3, for example, when the information processing device 10 performs the mode transition to the "care mode" and identifies the type of the assistance as the meal assistance. Note that the steps S41 to S43 in the FIG. 8 do not necessarily need to be performed in the "care mode", but may be performed in the "user mode".

When the type of the assistance is identified as the meal assistance, the controller 11 of the information processing device 10 controls the peripheral devices 40 before staring the meal assistance. For example, the controller 11 of the information processing device 10 controls an electric retractable curtain to open (step S41). As a result, outside lighting enter the room of the first user and the first user can wake up from his or her sleep. The controller 11 turns on the coffee maker (step S42) and the controller 11 turns on the television (step S43). This allows the first user to eat the meal while watching a TV program without using a remote controller to control the television. In addition, the controller 11 adjusts the electric bed so that the back bottom of the electric bed is raising and a height of the electric bed becomes a predetermined height which is easy to eat the meal (step S44). The first user in the bed can be a good position or posture to eat the meal. The controller 11 also moves the table as the peripheral devices 40 to a predetermined location (step S45). The table is a table used by the first user for the meals and may, for example, be located near or attached to an electric bed. The controller 11 moves the table to a position where the first user can easily eat, such as in front of the first user.

Next, the controller 11 determines whether or not the meal of the first user has started (step S46). For example, in the case of the meal assistance, the application that supports the meal assistance may be used, as well as the application explained in the section on the excretion assistance. The controller 11 may determine that the meal has started when the application supporting the meal assistance has been activated. Some devices dedicated to the meal assistance may be used together with the application supporting the meal assistance. The device dedicated to the meal assistance is, for example, a swallowing choke detection device that detects the swallowing and choke of the first user.

Figure 9:
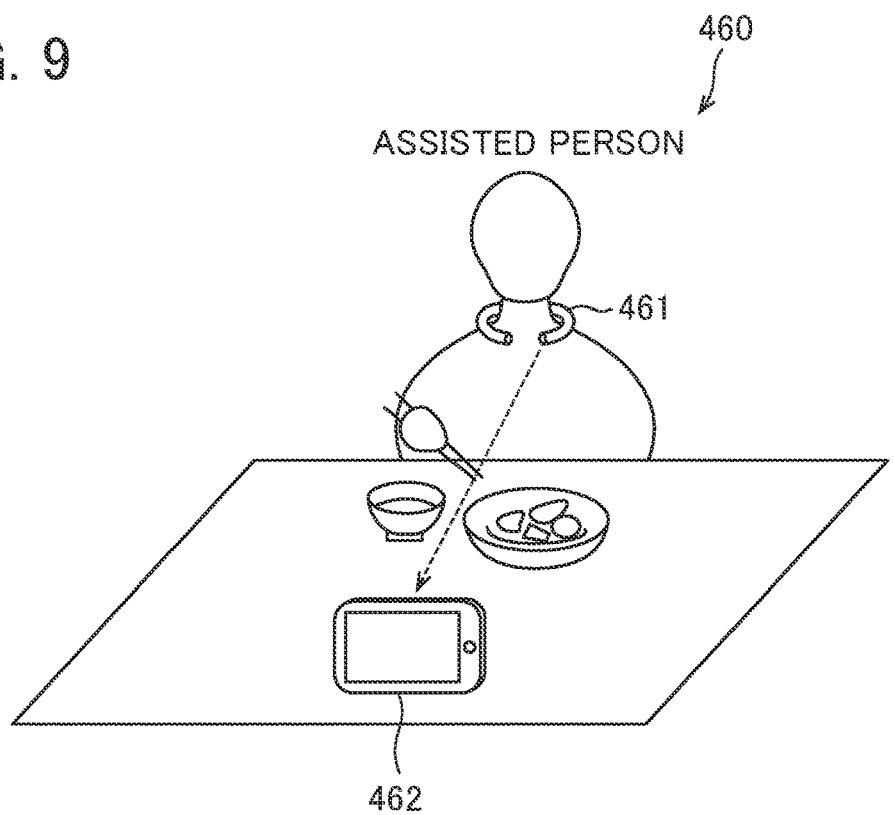
FIG. 9 is a diagram illustrating a swallowing choke detection device.

The FIG. 9 is a diagram illustrating the swallowing choke detection device 460. As shown in the FIG. 9, the swallowing choke detection device 460 includes a throat microphone 461 which can be mounted around the neck of the first user and a terminal device 462 with a camera. The throat microphone 461 outputs audio data from swallowing, coughing, etc. of the first user. The camera of the terminal device 462 outputs an image of the first user's state acquired by the camera. The terminal device 462 is, for example, a smartphone or tablet-shaped PC placed on a desk where the first user eats. The throat microphone 461 is electrically connected to a terminal device 462 using Bluetooth, wire or the like, and the terminal device 462 is electrically connected or communicable to the information processing device 10 via a network. However, both the throat microphone 461 and the terminal device 462 may be directly connectable to the server system 100, and the specific connection mode allows various modifications.

For example, the swallowing choke detector 460 determines the choke of the first user and swallowing of the first user based on the audio data acquired from the throat microphone 461. The devices which use a microphone worn around the neck to detect swallowing, are described, for example, in U.S. patent application Ser. No. 16/276,768, filed Feb. 15, 2019, whose title is "Swallowing action measurement device and swallowing action support system". This patent application is incorporated by reference herein in its entirety. The processor of the swallowing choke detector 460 can detect the number of choke, the time of choke (Time of occurrence, duration, etc.), and whether or not the first person swallows based on the audio data acquired from the throat microphone. The processor of the swallowing choke detector 460 provides the information to assist the second user in making decisions such as the timing of the talk to the assisted person, whether the serving of the meal should be discontinued or suspended, and whether the timing and amount of serving with a spoon is appropriate.

Figure 10:
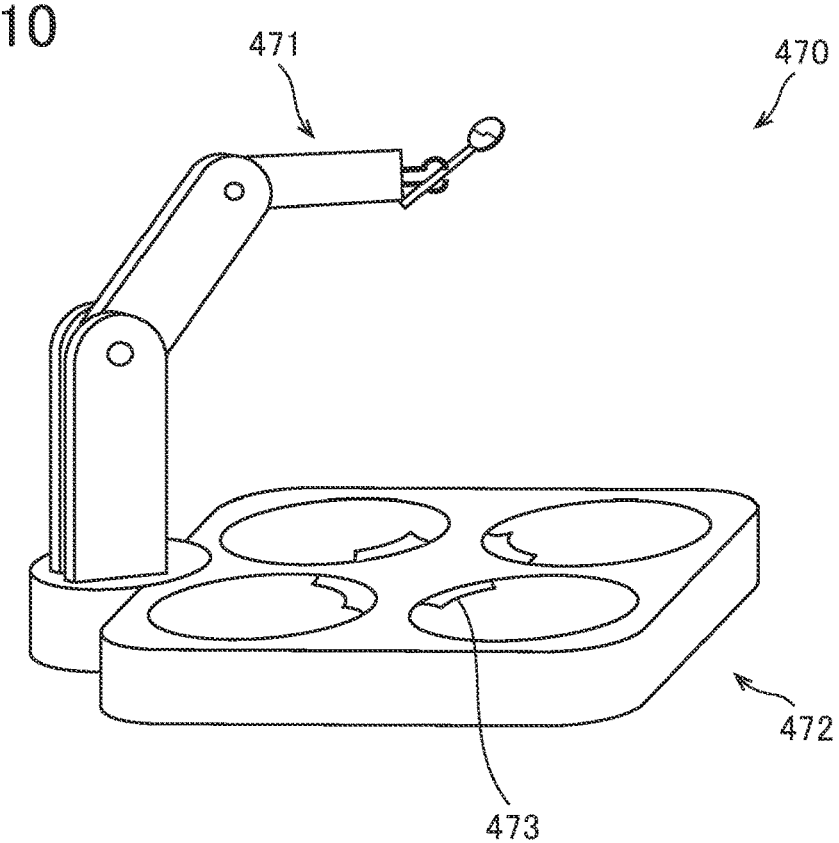
FIG. 10 is a schematic diagram showing the appearance of the self-feeding device.

When the controller 11 determines that the first user has started to eat the meals (Yes in the step S46), the controller 11 controls the peripheral devices 40 during the meal assistance. For example, the controller 11 causes the self-feeding device as the peripheral devices 40 to feed the meals to the first user (step S47) The self-feeding device is an assistance device used when the first user eats the meal, specifically, a device for automatically bringing the meals to the first user's mouth. The FIG. 10 is a schematic diagram showing the appearance of the self-feeding device. As shown in the FIG. 10, the self-feeding device 470 includes a container 472 containing multiple dishes in which the food is placed, and an arm 471 that scoops up a predetermined amount of food placed in the container 472 and carries the food to the mouth of the first user. The arm 471 includes a number of frames connected by, for example, a joint and an end effector provided at the tip. The end effector here may be, for example, the hand holding the spoon, or the spoon itself. The container 472 is provided with a tab 473. The tab 473 is a member whose one end is connected to the periphery of each dish and whose other end is inclined toward the center of the dish. The tab 473 can prevent food from spilling off the dish when scooping up the predetermined amount of food with a spoon. For example, the self-feeding device for a patient is described in U.S. patent application Ser. No. 15/094,800, application filed on Apr. 8, 2016, entitled as APPARATUS AND METHOD FOR FOOD CAPTURE. This patent application is incorporated by reference herein in its entirety. The self-feeding device 470 in this embodiment may be a self-feeding device disclosed in U.S. patent application Ser. No. 15/094,800 or a device with a similar mechanism to U.S. patent application Ser. No. 15/094,800. Based on the control signal received from the information processing device 10, the self-feeding device performs predetermined actions to carry the meal to the mouth of the first user.

Also, during the meal assistance, the controller 11 turns on the audio devices (step S48). The controller 11 further turns on the aroma diffuser (step S49). The controller 11 may set the temperature of the air conditioner to the appropriate temperature for eating the meals. The temperature for eating the meals may be set as a separate temperature different from the temperature set in the "user mode".

Then, the controller 11 determines whether or not the first user had finished eating the meals (step S50). For example, if the second user had inactivated the application for the meal assistance, that is, the second user had stopped to use the application, not suspended the application, the second user terminal device sends a signal to the controller 11. The controller 11 can determine that the first user had finished eating the meals when receiving the signal that the application has been stopped. Alternatively, for example, the controller 11 may measure the weight of what is placed on the table as the peripheral devices 40 and determine that the first user had finished eating the meals when the weight does not change for a predetermined period. Alternatively, the controller 11 may determine whether or not the first user had finished eating the meals based on the image captured by the camera as the peripheral devices 40. The controller 11 can recognize that the first user had finished eating the meals by applying the images captured by the camera into a learned model.

When the controller 11 determined that the first user had finished eating the meals (Yes in the step S50), the controller 11 performs an information processing after the completion of the meal assistance. For example, the controller 11 moves the table as the peripheral devices 40 to a predetermined location (e.g., the location placed before starting the meal assistance) (step S51). The controller 11 also confirms with the first user whether or not to turn off the television, audio devices and aroma diffuser (step S52). For example, the controller 11 can confirm whether or not to turn off the television, audio devices and aroma diffuser by voice or displaying a screen. Based on the response of the first user, the controller 11 turns off or maintains the television, the audio devices and the aroma diffuser on.

1.5.3 Control Content in the Transferring or Moving Assistance

Figure 11:
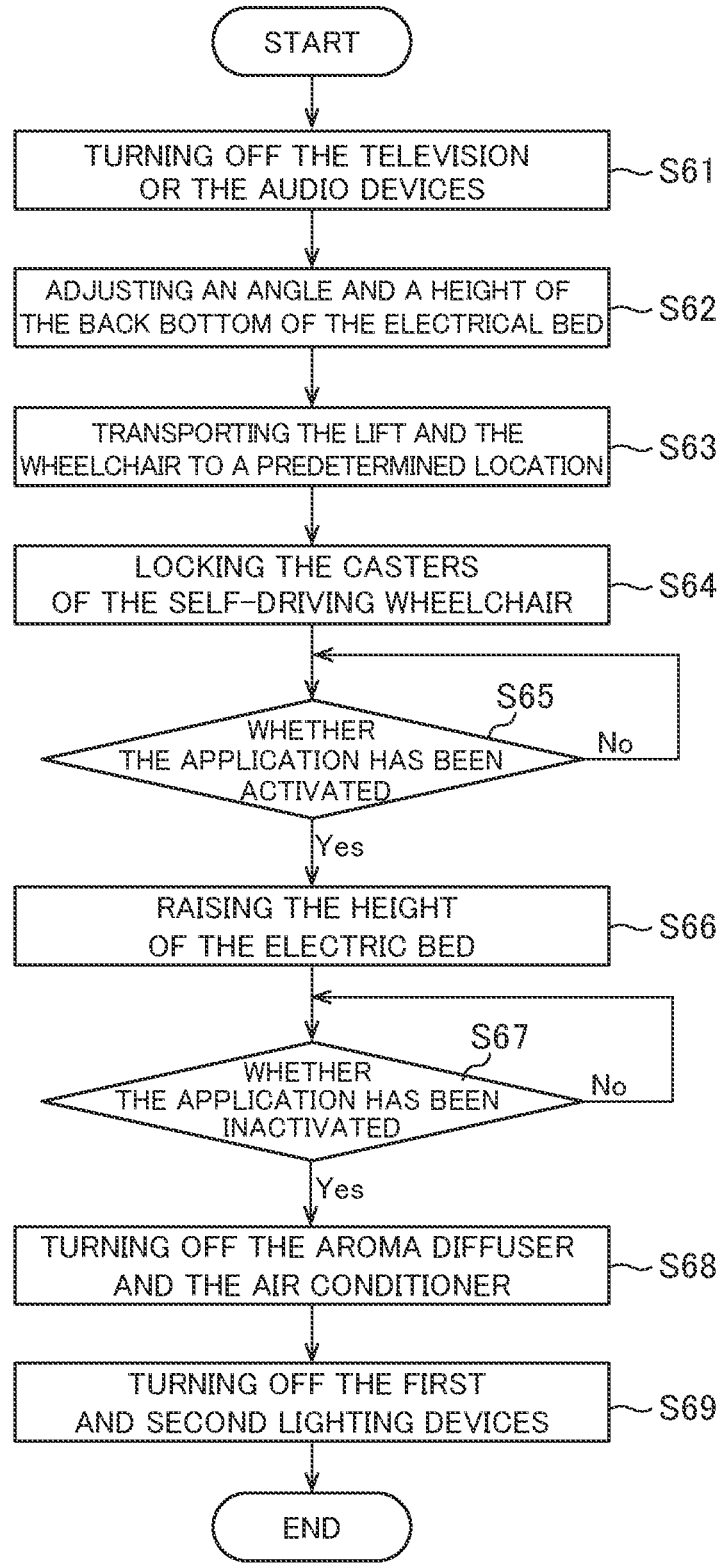
FIG. 11 is a flowchart showing an example of processing performed by an information processing device with a transfer assistance in the care mode

The FIG. 11 is a flowchart showing an example of the processing performed by the information processing device 10 with the "care mode" of the transferring or moving assistance. The information processing device 10 performs the flow of the FIG. 11 based on the table shown in the FIG. 3, for example, when the information processing device 10 performs the mode transition to the "care mode" and identifies the type of the assistance as the transferring or moving assistance.

When the type of the assistance is identified as the transferring or moving assistance, the controller 11 of the information processing device 10 controls the peripheral devices 40 before starting the transferring or moving assistance. For example, the controller 11 turns off the television or the audio devices (step S61). In addition, the controller 11 adjusts an angle of the back bottom of the electric bed so that the back bottom of the electric bed is raising, and adjusts the height of the electric bed which is easy to transfer (step S62). This makes the first user in the electric bed to take a good position and posture which is easy to transfer. The controller 11 may automatically transport the lift and the wheelchair as the peripheral devices 40 to a predetermined location (step S63). The predetermined location is a location where the first user can easily transfer to the wheelchair, for example, next to the electric bed. In this case, the lift and the wheelchair are self-driving lifts and self-driving wheelchairs driven by motors. The controller 11 locks the casters of the self-driving wheelchair (step S64). This secures the wheelchair at the location of the transferring.

Next, the controller 11 determines whether or not the application supporting the transferring or moving assistance has been activated (step S65). Similar to the application described in the excretion assistance, the application that supports the transferring or moving assistance is a digitized version of the caregiver's hunch or tacit knowledge and is used on a second user terminal device.

The second user terminal device sends a signal to the controller 11 of the of the information processing device 10 if the second user activates the application on the second user terminal device. The controller 11 can determine that the application supporting the transferring or moving assistance has been activated by receiving the signal from the second user terminal device. When controller 11 had determined that the application supporting the transferring or moving assistance has been activated (Yes in the step S65), the controller 11 controls the peripheral devices 40 during performing the transferring or moving assistance. For example, the controller 11 raises the height of the electric bed (step S66), thereby assisting the first user to stand up when transferring the user from the electric bed to the wheelchair.

During performing the transferring or moving assistance, the second user performs the transferring or moving assistance using this application. For example, the application assists the transferring or moving assistance to the second user, by providing instructions about how to move the second user's body to assist the first user, or instructions that the current position of the second user, the posture of the second user, the body framework of the second user, or the body skeleton of the second user captured by the camera should match a correct position, a correct posture, a correct body framework, or a correct body skeleton, regarding to the position in which the first user take a seat in the wheelchair, and the posture of the first user. This application that supports the transferring or moving assistance, may provide instructions to assist the transferring or moving assistance to the second user based on the physique of the second user and skill of the second user. The physique and skill of the second user may be input into the second user terminal device by the second user himself, for example.

When the transferring or moving assistance is completed, the second user operates the second user terminal device to exit this application. The controller 11 determines whether or not the application has been inactivated (step S67). For example, when the second user terminal device terminates or inactivates the application, the second user terminal device sends a notification indicating that the application has been inactivated to the information processing device 10, and the controller 11 can determine that the application has been inactivated based on the notification received from the second user terminal device.

When the controller 11 determines the application has been inactivated (Yes in the step S67), the controller 11 controls the peripheral devices 40 after the completion of the assistance. For example, the controller 11 turns off the aroma diffuser and the air conditioner (step S68) and the controller 11 turns off the first and second lighting devices (step S69)
1.6 Switching Between a First Interface and a Second Interface In this embodiment, one terminal device 20 may be used by both the first user and the second user. In this case, the interface of the terminal device 20 may be different depending on the first user or the second user. In the case that the interface of the terminal device 20 differs the user by the user, the terminal device 20 may automatically switch the interface according to the first user or the second user. An interface of the peripheral device 40 may be same as that of the terminal device 20, that is, the peripheral device 40 has a plurality of interfaces, and the interfaces may be switchable depending on the first user or the second user. For example, an operation input unit for the electric bed as a peripheral device 40 can switch the interfaces according to the first user or the second user.

Figure 12:
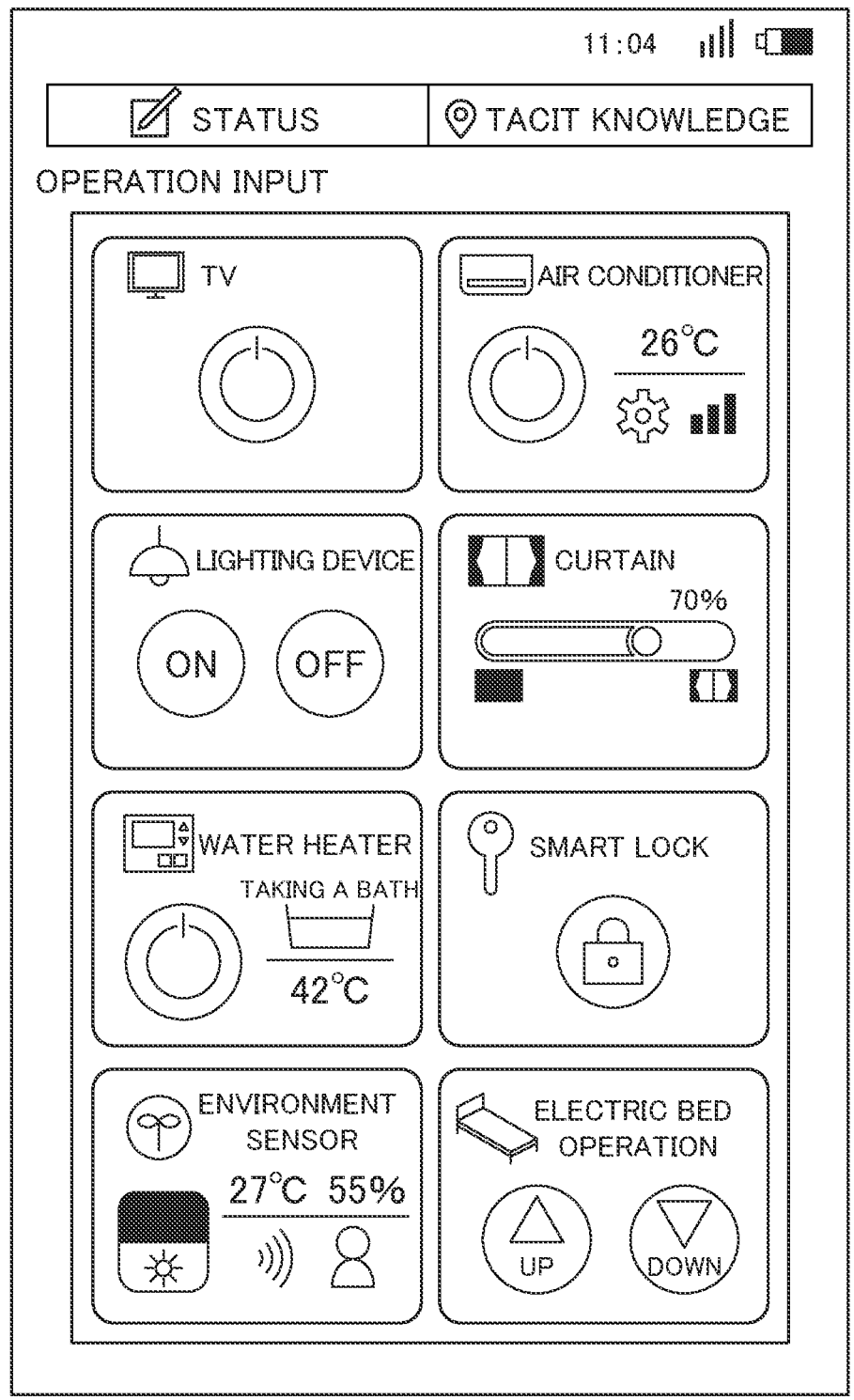
FIG. 12 shows a screen example when a first user uses.

The FIG. 12 shows an example of a screen when the first user is likely to use the terminal device 20. The FIG. 12 shows, for example, an example of a screen displayed on the display 24 provided with the touch sensor of the terminal device 20 to operate the peripheral devices 40. When the information processing device 10 determines that the first user will operate the terminal device 20 from, for example, an image captured by the camera, the terminal device 20 displays the screen shown in the FIG. 12. The terminal device 20 may initially display the screen shown in the FIG. 12 after the first user successfully logged-in.

As shown in the FIG. 12, the terminal device 20 displays a list of the peripheral devices 40 controllable by the terminal device 20 though the information processing device 10 and networks in the screen. The first user can operate the peripheral devices 40 which are displayed in the screen of the terminal device 20 by operating the terminal device 20. For example, when the first user or the second user performs an operation to turn on the power of the air conditioner (air conditioner) by the terminal device 20, the terminal device 20 transmit a control signal to the information processing device 10, and the information processing device 10 receives the control signal and transmits a signal for turning on the power of the air conditioner to the air conditioner. Then the air conditioner will turn on the power based on the signal for turning on the power of the air conditioner. In this way, the first user or the second user can use the terminal device 20 to operate the peripheral devices 40.

The screen shown in the FIG. 12 displays a button labeled "tacit knowledge" to display a list of the applications related to the aforementioned "tacit knowledge." If the first user or the second user want to use the applications related to the "tacit knowledge" and the screen shown in the FIG. 12 is displayed on the terminal device 20, the first or second user can makes the terminal device 20 display a screen (for example, the screen shown in the FIG. 13) of a list of applications related to "tacit knowledge" by tapping the button.

Figure 13:
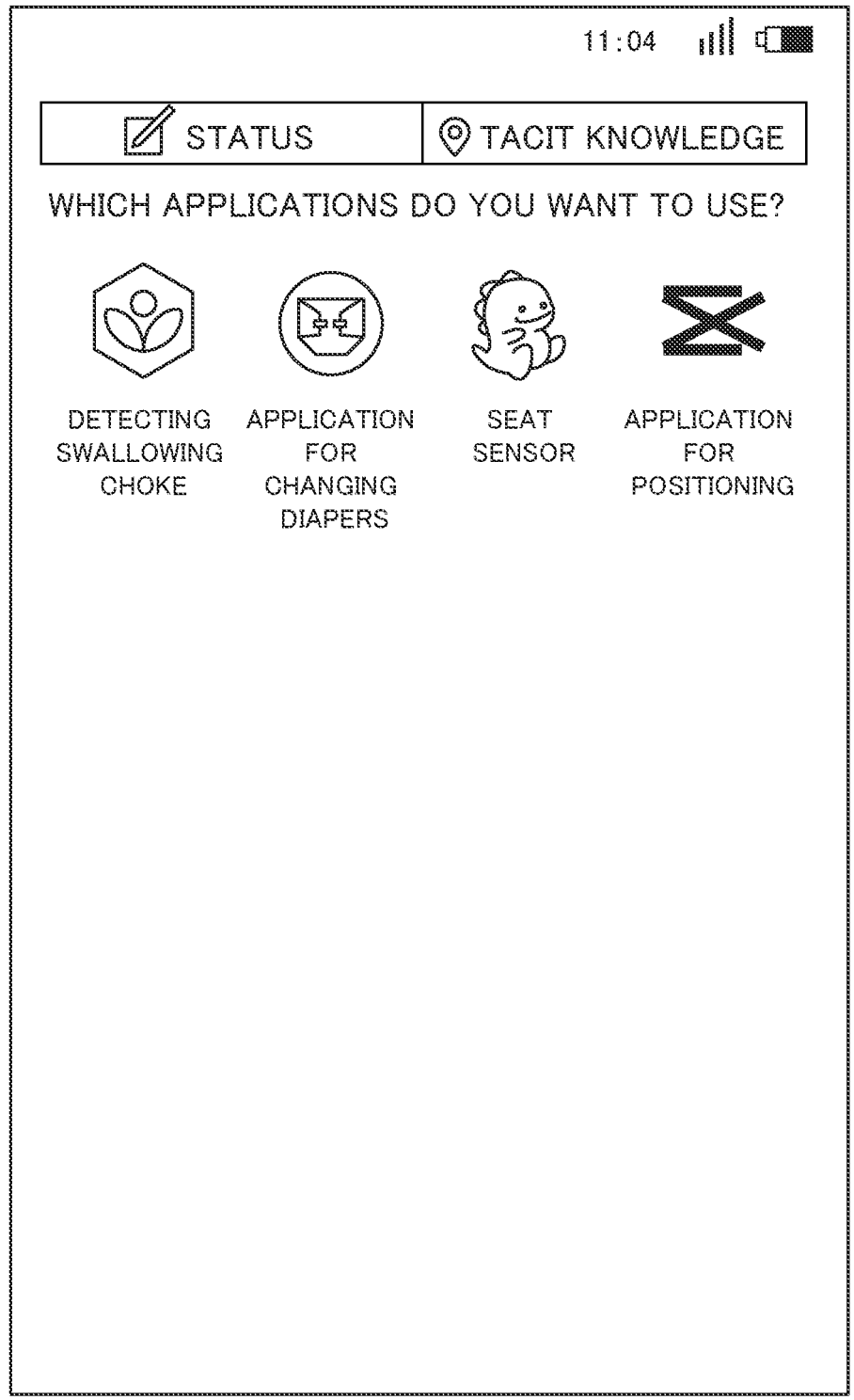
FIG. 13 shows a screen example when a second user uses.

The FIG. 13 shows an example of a screen when the second user is likely to use the terminal device 20. When the information processing device 10 determines that the second user will operate the terminal device 20 from, for example, an image captured by the camera, the terminal device 20 displays the screen shown in the FIG. 13. The terminal device 20 may initially display the screen shown in the FIG. 13 after the second user successfully logged-in.

As shown in the FIG. 13, the terminal device 20 displays a list of the applications used by the second user for the assistance. The applications used for the assistance includes an application for the excretion assistance, an application for the meal assistance, and an application for the transferring or moving assistance as described above. When the second user selects and touches a button or an icon indicating one of the applications, depending on the type of the assistance the second user want to perform, the terminal device 20 activates the application corresponding to the touched button or touched icon.

The screen shown in the FIG. 13 displays a button labeled "Operation" to display a screen shown in the FIG. 12 for operating the peripheral devices 40 described above. If the first user or the second user want to operate the terminal devices 20 and the screen shown in the FIG. 13 is displayed on the terminal device 20, the first or second user can makes the terminal device 20 display a screen (for example, the screen shown in the FIG. 12) for input to the peripheral devices 40 by tapping the button.

In the above example, the screen initially displayed on the terminal device 20 may be automatically changed according to the first user or the second user after logging in. but changing the screen is not limited to this above example, even when the second user operates the terminal device 20 in the "user mode" (For example, when the first user is not in the first user's room and only the second user is in the first user's room), the terminal device 20 may initially display a screen shown in the FIG. 12 if the second user activates the software including a plurality of applications. The terminal device 20 may initially display a screen shown in the FIG. 13 if the mode of the information processing device 10 is the "care mode". Also, even when the mode of the information processing device 10 is the "care mode", the terminal device 20 may initially display a screen shown in the FIG. 12 if the type of the assistance can not be identified. The terminal device 20 may initially display a screen shown in the FIG. 13 if the type of the assistance can be identified.

Thus, when only the first user (assisted person) is in the room of the first user, the information processing device 10 causes the peripheral devices 40 to perform the control content associated with the "user mode", and when the information processing device 10 detected that another person (the second user, caregiver) has entered the room of the first user, the information processing device 10 performs the mode transitions to the "care mode" and causes the peripheral devices 40 to perform the control content associated with the "care mode". The Peripheral devices 40 performs an information processing according to the mode of the information processing device 10 based on the control signal received from the information processing device 10. This enables control taking into account the characteristics of both the first and second users. This makes it feasible to control the situation more suitable and broadly.

In this embodiment, the information processing device 10 performs the mode transition among four modes. However, the mode transition need not necessarily be performed by the information processing device 10. The mode transition may be performed by, for example, a terminal device 20 or an external device which is not shown.

In the present embodiment, the information processing device 10 performs the mode transition among four modes. However, the information processing device 10 only needs to operate in at least two modes, which is the "user mode" and the "care mode". It is possible to switch the control processing according to a status whether the first user and the second user is in the room of the first user by operating in at least these two modes.

2. Second Embodiment

2.1 System Configuration Examples

Figure 14:
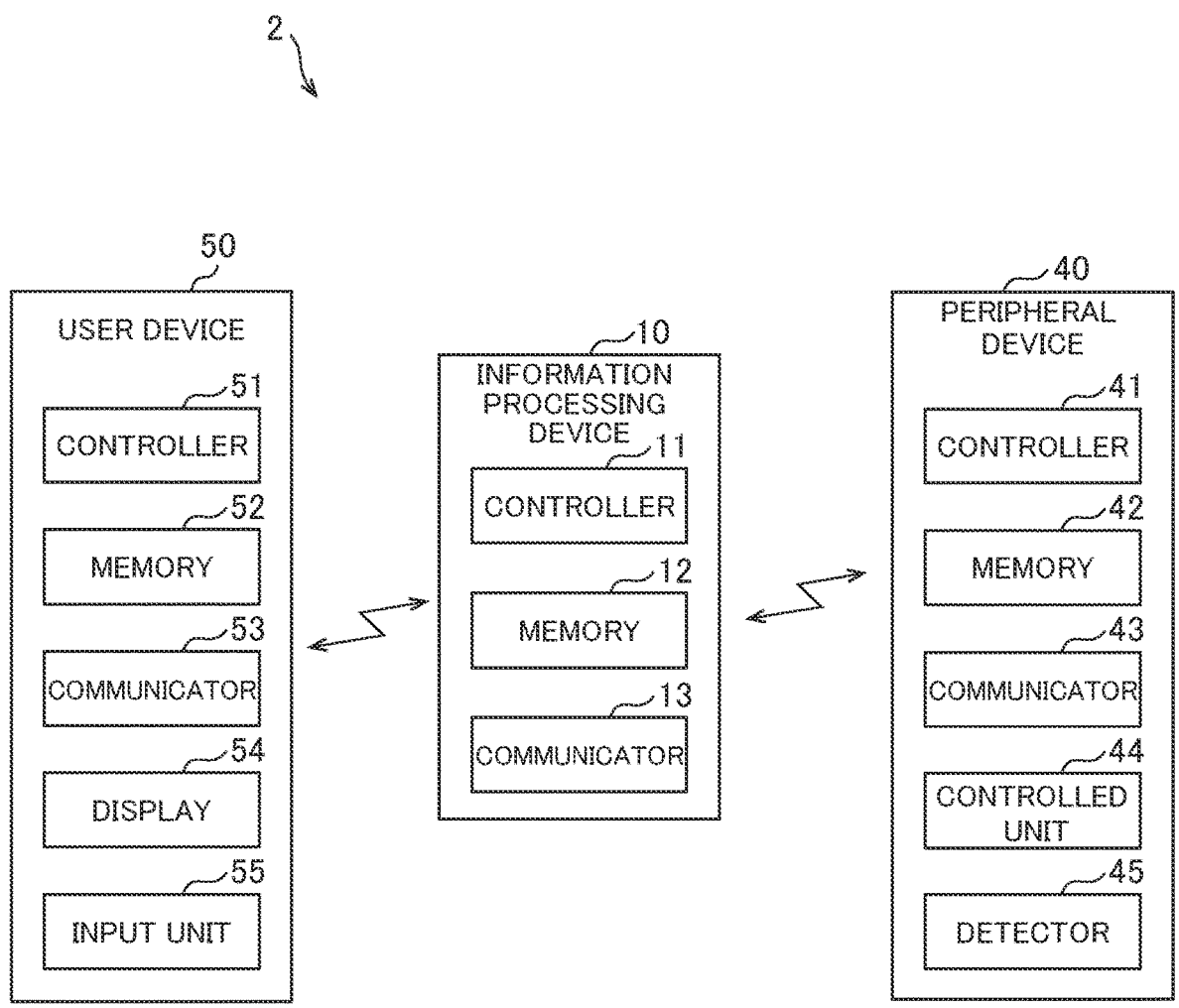
FIG. 14 shows an example of the configuration of the control system according to the second embodiment.

The FIG. 14 shows an example of the configuration of the control system 2 according to the second embodiment. The control system 2 is a system that supports the daily life of the first user. The control system 2 according to the second embodiment differs from the control system 1 according to the first embodiment in that the control system 2 is not used in the room of the first user, but in a public space used by other assisted persons. The public space is, for example, a dining room used by multiple users in a hospital or a nursing facility for the elderly person. However, the public spaces are not limited to dining room and may be other facilities.

In the second embodiment, the control system 2 includes an information processing device 10, a peripheral device 40, and a user device 50. Hereafter, the same configuration of the second embodiment as those of the first embodiment will be not explained and the different configuration will be explained.

In this embodiment, the information processing device 10 includes, for example, a server device. The information processing device 10 may be realized by, for example, a cloud server. The information processing device 10 is electrically connected or communicable to peripheral devices 40 and user devices 50 respectively. The communication method of this embodiment may be the same as that of the first embodiment described above. The information processing device 10 receives various kinds of information from the peripheral devices 40 and the user devices 50. The information processing device 10 performs prescribed information processing on the basis of the received information and can cause the peripheral devices 40 to perform prescribed control processing by transmitting control signals to the peripheral devices 40.

As shown in the FIG. 10, the information processing device 10 includes a controller 11, a memory 12, and a communicator 13. Since the functions and configuration of the controller 11, the memory 12 and the communicator 13 may be the same as those in the first embodiment, a detailed explanation is omitted here.

The peripheral devices 40 are any devices located in a public space where the control system 2 is used, such as in the dining room. The peripheral devices 40 may include, for example, a television, lighting devices, air conditioners, aroma diffusers, audio devices, etc. As shown in the FIG. 14, the peripheral devices 40 includes, as functional units, a controller 41, a memory 42, a communicator 43, a controlled unit 44 and a detector 45. The functions and configurations of the controller 41, the memory 42, the communicator 43, the controlled unit 44 and the detector 45 may be the same as those in the first embodiment, so a detailed explanation is omitted here.

The user device 50 is a device used by the first user. The user device 50 is, for example, a device that can move with the first user. Specifically, the user device 50 may be, for example, a terminal device such as a smartphone or tablet used by the first user. Alternatively, the user device 50 may be attached to a wheelchair used by the first user. In this case, the wheelchair may have the function as a user device 50. The user device 50 includes a controller 51, a memory 52, a communicator 53, a display 54, and an input unit 55 as functional sections.

The controller 51 controls and manages the entire user device 50. The controller 51 can include at least one of a circuit for processing digital signals and a circuit for processing analog signals as hardware. For example, the controller 51 can include hardware such as one or more circuit devices mounted on a circuit board or one or more circuit elements. The controller 51 may be implemented by a processor. The processors can use a variety of processors, including CPUs, GPUs and DSPs.

The memory 52 is the work area of the controller 51 and includes various memories such as SRAM, DRAM, and ROM.

The communicator 53 is an interface for communication through a network and includes, for example, an antenna, an RF circuit, and a baseband circuit. The communicator 53 may perform a processing according to an instruction from the controller 51 or may include a processor to perform a communicating processing which is different from the communicating processing of the controller 51.

2.2 Processing Example by Control System

In the second embodiment, when the first user enters the public space where the control system 2 is used, the information processing device 10 controls the peripheral devices 40 by transmitting control signals to the peripheral devices 40. An example of processing by the control system 2 will be described with the reference to the FIG. 15.

Figure 15:
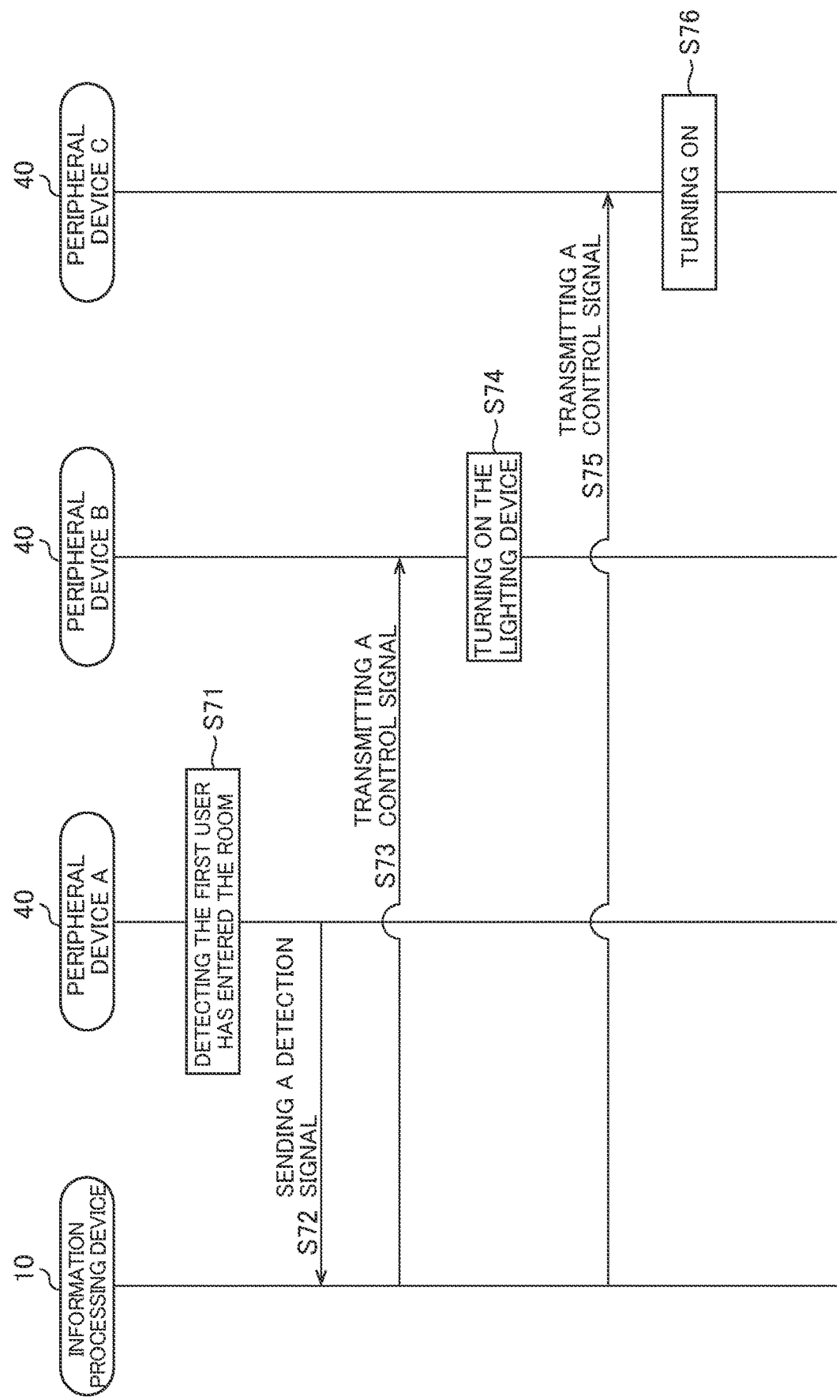
FIG. 15 is a sequence diagram showing an example of processing by the control system of the FIG. 14.

The FIG. 15 is a sequence diagram showing an example of processing by the control system 2 according to the second embodiment. In the FIG. 15, we assumed that the peripheral device A is a camera, the peripheral device B is a lighting device, and the peripheral device C is an audio device. Furthermore the peripheral device B (the lighting device) and the peripheral device C (the audio device) are turned off at the beginning of the sequence.

The peripheral device A, which is a camera, takes images inside of the dining room. The camera may determines whether or not the first user has entered the dining room, for example, by analyzing the taken images. When the camera detects that the first user has entered the dining room (step S71), the camera sends a detection signal to the information processing device 10 indicating that the first user has entered the dining room (step S72).

When receiving the detection signal, the information processing device 10 sends a control signal to the peripheral devices 40 to perform the specific processing. For example, the information processing device 10 transmits a control signal to turn on the peripheral device B, which is a lighting device (step S73).

When receiving the control signal from the information processing device 10, the lighting device turns on the lighting (step S74). In this way, when the first user enters the dining room, the light in the dining room are automatically turned on.

In addition, the information processing device 10 transmits a control signal for turning the power on to the peripheral device C, which is, for example, an audio device (step S75).

When the audio device receives the control signal from the information processing device 10, the audio device turns on the power (step S76). In this way, when the first user enters the dining room, the audio device installed in the dining room is automatically turned on.

In this way, the control system 2 according to the second embodiment can perform a control processing in a public space. The processing described in FIG. 15 is only an example. Therefore, the information processing device 10 may send control signals to other peripheral devices 40 and may cause other peripheral devices 40 to perform different control processing from those processing described above.

The control system 2, for example, determines whether a person entering the dining room is the first user or the second user who is the assisted person, and performs different controls on accordance with the determination result (the first user or the second user). For example, when the information processing device 10 or the camera analyzes an image captured by a camera, the information processing device 10 or the camera may determine a person in a wheelchair as the first user and a person not in a wheelchair as the second user. The information processing device 10 may transmit different control signals to the peripheral devices 40 depending on whether the person entering the room is the first user or the second user. Alternatively, the information processing device 10 may send control signals to the peripheral devices 40 only when the information processing device 10 or the camera determined that the person entering the room is the first user.

Whether the person entering the room is the first user or the second user may be determined by other ways without using the camera. For example, whether the person entering the room is the first user or the second user may be determined using RFID. Specifically, the first user and the second user may carry terminal devices, ID cards, etc., to which an RFID tag is attached. The RFID reader placed in the dining room reads the information of the RFID tag when the first user or the second user enters into the dining room, the information processing device 10 can determine whether the person entering the dining room is the first user or the second user on the basis of the read information by referring to the information of the user's attributes stored in the memory 12. The information processing device 10 can transmit different control signals to the peripheral devices 40 depending on whether the person entering the room is the first user or the second user. Thus, the control system 2 according to the second embodiment is capable of performing a control processing considering the characteristics of both the first user and the second user in a public space. In other words, this makes it feasible to control the situation more suitable and broadly.

In the second embodiment, the information processing device 10 may identify the type of the assistance that the second user intends to perform when the second user enters the dining room. Since the method for identifying the type of the assistance may be the same as that described in the first embodiment, for example, the detailed explanation is omitted here. In the second embodiment, the information processing device 10 may also perform a control processing according to the specified type of the assistance. For example, the information processing device 10 can control and automatically move a self-driving meal cart (the peripheral device 40) to a predetermined location when the type of the assistance is the meal assistance. In this way, in the second embodiment, the information processing device 10 controls the peripheral devices 40 according to the type of the assistance.

Since the control system 2 according to the second embodiment is used in a public space, the control system 2 should perform an information processing according to the characteristics of each first user. For example, we assume that the temperature setting of an air conditioner in a public space, such as a dining room, is 26 degrees and appropriate temperature setting for a particular first user is 28 degree which is different from the temperature setting in a public space. The appropriate temperature for each first user is stored in the memory 12, for example, by inputting setting from the second user or the manager. In this case, the particular first user may feel cold when entering into the public space with the temperature setting set to 26 degrees. Therefore, when the specific first user enters into the public space, the information processing device 10 turns on the heater used by only the specific first user, for example, as a peripheral device 40 (a user device 50). The heater is installed in, for example, a wheelchair used by the first user. Thus, the control system 2 can generate a more comfortable environment for a specific first user while maintaining the environment of the public space.

2.3 Pairing the Peripheral Devices

The control system 2 according to the second embodiment pairs each first user with a tool as a peripheral device 40 used in the assistance for the first user in advance, when the control system 2 performs a control processing according to the type of the assistance. Since the control system 2 according to the second embodiment is used in a public space, a plurality of tools used in the assistance may be arranged in the dining room for the number of the first users. In this case, the control system 2 has to pair each tool is to be used with each first user beforehand.

The pairing between each first user and each tool can be done in a variety of ways. For example, a plurality of RFID tags which store an uniquely identification information is attached to a plurality of tools, and the second user or an administrator of a control system 2 confirms the tools used by each first user and inputs information to associate the first user with the identification information of the tools into the information processing device 10. Thereby the information paired between each first user and each tool may be stored in the memory 12.

The pairing between each first user and each tool can be done by more convenient ways other than the above method. For example, the pairing between each first user and each tool can be done using the QR code. Specifically, each tool is attached to one QR code. The second user or the manager of the control system 2 or the like reads the QR code attached to the tool associated with the specific first user by using the QR code reader function of the terminal device, and the terminal device can communicate with the information processing device 10.

Figure 16:
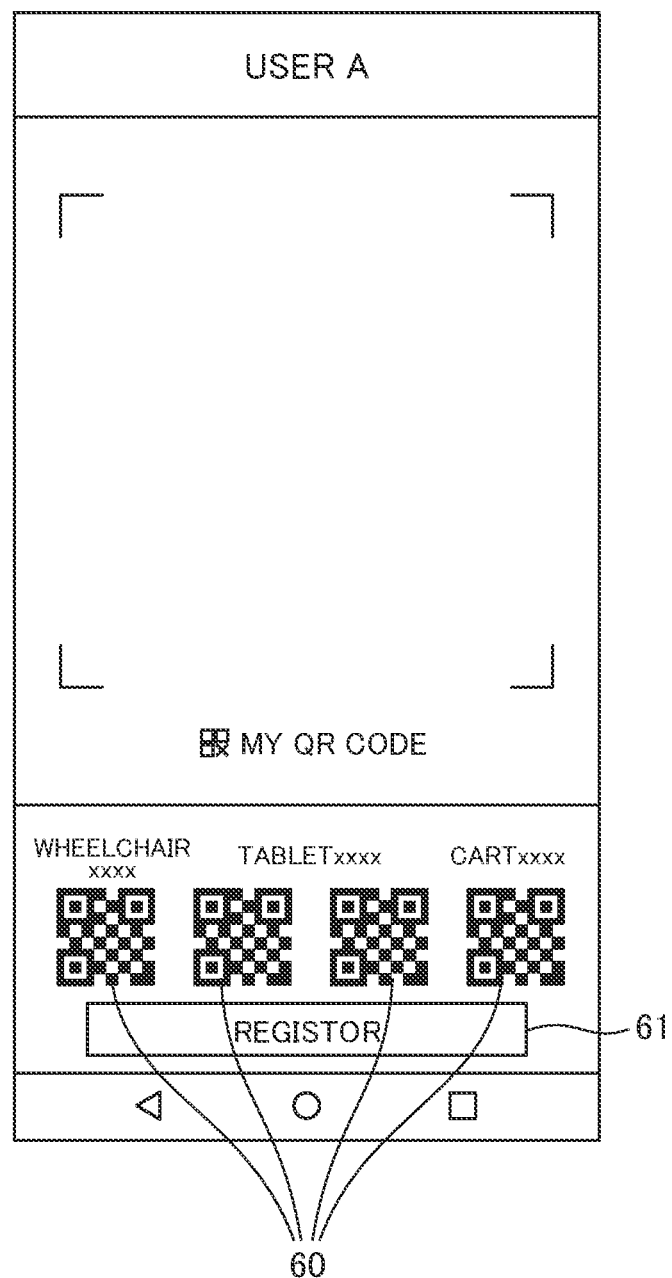
FIG. 16 shows an example of a QR code reading screen in a terminal device.

The FIG. 16 shows an example of a QR code reading screen in a terminal device. The second user or administrator operates the terminal device, activates software to read the QR code, and open a browser to read the QR code reading screen. The second user or administrator selects a user name on the QR code reading screen. The user name is the name of the first user managed by the control system 2, for example, the name of the first user who uses the dining room. Selectable user names are stored in advance in the memory of the terminal device, for example. In the example shown in the FIG. 16, "User A" is selected as the user name.

After selecting the user name, the second user or the administrator of the control system 2 reads a QR code attached to a tool corresponding to the selected first user by using the terminal device. The reading method of the QR code may be known methods. Here, in the case of reading a plurality of QR codes, the terminal device can display the information of the all read QR codes on the display. For example, as shown in the FIG. 16, the terminal device may display the read QR codes 60 at the bottom of the screen as information of the read QR codes. The read QR codes information may not necessarily be displayed as a QR code type 60. For example, the read QR codes information may be information indicating the name of the tools of the assistance to which the read QR code is attached. Each time the terminal device reads the QR code, the read QR codes information may be displayed on the display of the terminal device. That means that the number of the read QR codes information displayed on the screen increases each time the second user or the administrator read the QR code. In the example shown in the FIG. 16, the four QR codes 60 are illustrated as the read QR codes information on the display of the terminal device. If the second user or the administrator reads the QR codes of tools of the assistance which are not for the selected first user by mistake, the second user or the administrator may perform an operation to delete the read QR code information (QR code 60) displayed on the display of the terminal device.

After the second user or the administrator reads all the QR codes attached to the tools of the assistance associated with the selected first user, the second user or the administrator performs the process of associating the selected first user with the tools of the assistance associated with the selected first user by performing a operation input. The operation input is, for example, an operation input of tapping a predetermined button, for example, an operation input of tapping the "register" button 61 shown in the FIG. 16. When the second user or the administrator taps the "register" button 61, the terminal device sends an instruction to the information processing device 10 that associates and stores the first user and the tools of the assistance used by the selected first user. The information processing device 10 associates the selected first user with the tools of the assistance and stores this information in the memory 12. For example, the memory 12 stores a table in which the selected first user is associated with tools of the assistance used by the selected first user as the peripheral devices 40. As a result of this, the information processing device 10 pairs the selected first user with the tools of the assistance and completes the pairing processing. If the pairing processing is already completed beforehand, when the information processing device 10 identifies the first user who has entered the public space, the control system 2 according to the second embodiment may transmit the control signals to only the peripheral devices 40 (the user devices 50) that are tools associated with the first user who has entered the public space. Thus, only the tools associated with the first user who has entered the public space can be controlled by the control system 2.

Although we had explained the example of the pairing processing by reading the QR code in this embodiment, the pairing processing does not necessarily need to be performed using a QR code. Instead of using the QR code, another code such as a barcode or an NFC tag may be used. Again, the pairing processing can be done by reading a code such as a barcode or an NFC tag.

Although we had explained the example of pairing the tool of the assistance with the first user in this embodiment here, this example of the pairing processing may be applied to pairing the type of the assistance with the tool of the assistance as a peripheral device 40.

3. Applied Example 3.1 Automatic Setting Change

Since the second user may assist the assistance (e.g. the excretion assistance) while the first user is sleeping, the first user may wake up sometimes during the night. In this case, the information processing device 10 may perform a first control processing to the peripheral devices 40 before waking up during the night, and may perform a second control processing to the peripheral devices 40 after waking up during the night. Since the first control processing is different from the second control processing, the peripheral devices 40 is controlled differently between before waking up during the night and after waking up during the night.

For example, the information processing device 10 determines whether or not the first user has been awakened on the basis of the body vibration of the first user detected by the user state detector. When the information processing device 10 determines that the first user has been awakened, the information processing device 10 may send a control signal to the peripheral devices 40 to be performed by the second control processing. The information processing device 10 may send a control signal to the peripheral devices 40 to be performed by the first control processing before the information processing device 10 determines that the first user has been awakened. In this case, the information processing device 10 controls the peripheral device 40 so that the peripheral environment of the first user becomes an environment in which the first user can easily sleep again after being awakened. For example, the information processing device 10 may send a control signal to the lighting devices to change the illuminance, send a control signal to the air conditioner to change the set temperature, or send a control signal to the electric bed to perform raising the back bottom, raising the knee bottom, adjusting a height of the electric bed, or tilting a frame of the electric bed. The information processing device 10 may learn a model about the environment in which the first user is likely to sleep again after being awakened for example using the artificial intelligence. Specifically, the information processing device 10 can learn the environment in which the first user is likely to sleep after being awakened based on the control content for the peripheral device 40, and the body vibration of the first user detected by the user state detector 200 or a certain index related to sleeping of the first user.

3.2 Evaluating the Application Related to the Assistance

The quality of sleeping of the first user may change due to the assistance of the second user while the first user is sleeping (e.g. the excretion assistance). Here, if the second user provides the assistance to the first user using, for example, the application that supports the assistance, the quality of sleep of the first user may be more or less likely to decrease depending on the application used by the second user. Therefore, the information processing device 10 may evaluate the application based on the change between the quality of the first user's sleep before the second user provides the assistance and the quality of the first user's sleep after the second user provides the assistance.

For example, the information processing device 10 can evaluate the quality of sleep by the sleep score calculated based on the body vibration of the first user detected by the user state detector. That is, the information processing device 10 can evaluate that the higher the sleep score is, the higher the quality of sleep of the first user is. The information processing device 10 associates, for example, the application with the change of the sleep quality of the first user and stores information including the application and the corresponding change of the sleep quality of the first user in the memory 12. Then, the information processing device 10 compares the change (e.g., rate of change or amount of change) in the sleep quality of the first user for each application, so that the information processing device 10 can evaluate each application used for the assistance.

The information processing device 10 evaluates the application used for the first user. When the information processing device 10 recognizes that the evaluation of this application is low for the prescribed first user (That is, when the rating of the application is below a threshold), the information processing device 10 recommends to the second user different application with the high evaluation among the similar applications applied to the first user with the same or similar attributes as the prescribed first user.

The information processing device 10 may evaluate the assistance or the application for each first user. This is because the changes in the sleep quality of the first user may vary first user by first user even with using the same application. After the evaluation of the assistance or the application for the prescribed first user, the information processing device 10 may display the highly evaluated application for the prescribed first user. This makes it harder for the assistance to reduce the quality of sleep for the prescribed first user.

3.3 Sharing Data

In the above embodiment, we had explained the example where the control system is used in a private room of the first user or public space. However, the control system can also be used in common at multiple facilities including a home, nursing facilities and hospitals. In this case, for example, one information processing device 10 described in the above embodiment is provided for each facility. When one first user uses these multiple facilities in his or her life, the information related to the first user can be shared among a plurality of the information processing devices 10 provided in each of the multiple facilities.

The multiple facilities include, for example, the home of the first user, hospitals, nursing facilities and an elderly facility. However, the multiple facilities are not limited to these example described above and may include any facilities used by the first user.

The home of the first user is a facility where the first user lives in his daily life. The first user uses the control system described above at home. Since the first user is a healthy person, there is no need to use any assistance. The information processing device 10 may have only three modes except for the "care mode", that is, the "off-mode", the "standby mode" and the "user mode". That is, in this case, when the first user is staying in the room of the first user, the information processing device 10 goes into the "standby mode", and when the first user has an intention to sleep, the information processing device 10 goes into the "user mode". The information processing device 10 stores the setting information of the first user in the memory 12 when the first user uses a control system at home. The setting information of the first user may be the setting information learned by the information processing device 10 or the setting information set by the first user. The setting information of the first user shows a comfortable environment for the first user for example. For example, the memory 12 of the information processing device 10 stores the set temperature of the air conditioner, the illuminance of the lighting device, etc.

Now we assume that the first user is admitted to a hospital, either because the first user has illness or the first user has injured. The Hospital also use the control system described in the above embodiment. In this case, the control system used in the hospital takes over the setting information of the first user from the control system used by the first user at home, therefore the information processing device 10 of the control system used in the hospital may apply the setting information of the first user stored in the information processing device 10 of the control system used by the first user at home to the setting information of the peripheral device in the hospital as the setting information of the first user. The setting information of the first user may be transmitted from the control system at home to the control system in the hospital via a network such as the Internet, for example. By taking over the setting information of the first user from the control system at home, the control system in the hospital can control the environment in the hospital similar to the environment at home. For example, in a hospital, the set temperature of an air conditioner and the illuminance of a lighting device are controlled similar to those at home. In addition, in the public space of the hospital, the peripheral devices in the public space may be controlled according to the setting information of the first user. For example, we assume that the temperature setting of an air conditioner in a public space, such as a dining room, is 26 degrees. On the other hand, regarding the setting information of the first user who is admitted to the hospital, the setting temperature of the air conditioner is 28 degrees. In this case, the information processing device 10 of the control system in the hospital turns on the heater used by only this first user as a peripheral device 40 (a user device 50) for example. The heater is installed in the wheelchair used by this first user. Thus, the control system 2 in the hospital can generate a more comfortable environment for this first user while maintaining the environment of the public space.

Also, while the first user is in the hospital, new settings may be added to the setting information of the first user. For example, in a hospital, if the application is used to support the assistance for the first user, the application for the first user can be added as the setting information of the first user.

When the first user leaves the hospital and returns home, the first user again uses the control system used by the first user at home. In this case, the control system used at home takes over the setting information of the first user added in the hospital from the control system used in the hospital. If some of the peripheral devices in the hospital is not common in the peripheral devices at home, a setting information related to these peripheral devices (which is not common) may not be taken over to the control system used at home. This allows the first user to generate the environment at home similar to that of a hospital. In addition, for example, when some application for the assistance of the first user is added in the hospital as the setting information of the first user, the information processing device 10 at home may automatically install this application on the terminal device 20 to support the assistance used in the hospital or may automatically display information to recommend the installation of this application on the terminal device 20. Thus, even at home, the first user himself or his family member who becomes the second user can use the application used in the hospital without any selecting the application by the first user or his family member.

Suppose further that the first user becomes elderly and moves into a nursing home or a nursing facility. The nursing home or the nursing facility also uses the control system described in the above embodiment. In this case, the control system used in the nursing facility takes over the setting information of the first user from the control system used at home, therefore the information processing device 10 of the control system used in the nursing facility may apply the setting information of the first user stored in the information processing device 10 of the control system used by the first user at home to the setting information of the peripheral device in the nursing facility as the setting information of the first user. The setting information of the first user may be transmitted from the control system at home to the control system in the nursing facility via a network such as the Internet, for example. By taking over the setting information of the first user from the control system at home, the control system in the nursing facility can control the environment in the nursing facility similar to the environment at home. For example, in the nursing facility, the set temperature of an air conditioner and the illuminance of a lighting device are controlled similar to those at home. Since the setting information of the first user at home includes the setting information of the first user in the hospital, the setting information of the first user in the nursing facility includes the setting information of the first user in the hospital. In this way, the setting information of the first user can be taken over among multiple facilities, which makes it easier for the first user to generate the environment that is comfortable for him or her in any facility.

The first user may change the setting information of the first user as appropriate by the input operation of the terminal device. For example, the first user may change the set temperature of the air conditioner stored in the memory 12 of the information processing device 10 by performing a prescribed operation input to the terminal device 20. This allows the first user to set up what the first user feel comfortable with at the time. When the setting information of the first user is taken over between a plurality of facilities, for example, the latest setting information of the first user is taken over. Alternatively, when the setting information of the first user is taken over between a plurality of facilities, the setting information of the first user may be taken over by appropriately weighting according to the time when the setting information was changed, etc.

3.4 User Status Display

The Hospitals and the nursing facilities need to manage and control the status of the first users. However, it is not easy for the caregivers at hospitals and the nursing facilities (that is, the second users) to keep track of the status of the first users. In particular, if there are so many items indicating the status of the first users or there are many first users using the facilities, it is difficult to grasp the status of the first users. Therefore, the information processing device 10 of the control system used in the hospital or the nursing facilities can display the status of the multiple first users, for example, on the terminal device of the second user, in a way that is easy to understand at a glance.

For example, the information processing device 10 can control the terminal device to display the status of the first users regarding the ADL (Activity of Daily Living) as the status of the first users. The ADL is an index of the minimum activities required for daily living. The ADL is calculated based on activities such as transferring, moving, going up and down stairs, changing clothes, grooming, defecating, urinating, using the toilet, bathing, and eating meals. The ADL may be calculated by known methods. This ADL may be calculated based on data acquired from the peripheral devices 40. The ADL of the first user is stored, for example, in the memory 12 of the information processing device 10.

Figure 17:
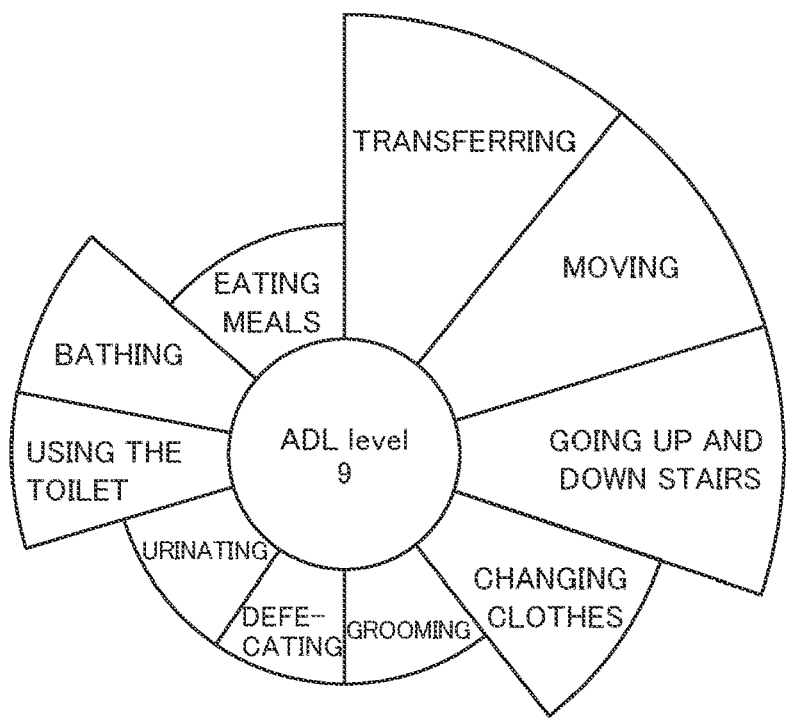
FIG. 17 shows an example of the status display of the first user.

For example, the information processing device 10 displays the status of the first users using a pie chart, as shown in the FIG. 17 as an example. Regarding displaying the status of the first users related to ADL, the risk of each item indicating ADL activity is indicated by a pie chart. In the example shown in the FIG. 17, there are a plurality of items of the ADL activity such as transferring, moving, going up and down stairs, changing clothes, grooming, defecating, urinating, using the toilet, bathing, and eating meals. The information processing device 10 can display the status of the ADL of the first users based on the ADL information stored in the memory 12. Regarding a method of displaying the status of the first users, for example, as shown in the FIG. 17, for each item, the higher the risk is, the larger the radius of the pie chart is. Here, a type of the risk includes a falling, a pressure ulcer, and an aspiration. High risk described above indicates that there is a high possibility that the incident risk such as the falling, the pressure ulcer, and the aspiration exposes if the first user performs the activities by himself or by herself. The example shown in the FIG. 17 indicates that the transferring activity, the moving activity and the activity to go up and down stairs have the highest risk. The highest risk can be understood for transfer, transfer, and stair terms. The method of displaying the status of the first users is not limited to a difference in the radius of the pie chart, but may be expressed by a difference in color, for example.

Figure 18:
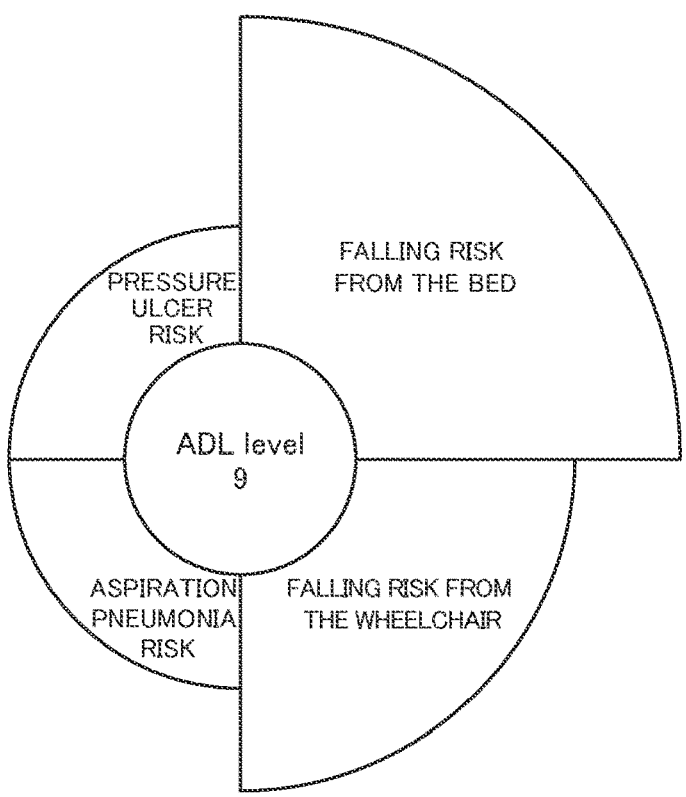
FIG. 18 shows another example of the status display of the first user.

The information processing device 10 may control the terminal device to display the status related to the risk of the first user as the status of the first user. Specifically, the status of the first user is shown using a pie chart, as shown in the FIG. 18 as an example. As to the method of displaying the risk of the first users, a pie chart shows how high the risk is for each risk item. In the example shown in the FIG. 18, the risk items include a falling risk, an aspiration pneumonia risk and a pressure ulcer risk. Using an algorithm for calculating the height of each risk item from the ADL stored in the memory 12, the information processing device 10 can calculate the height of the risk for each risk item and display the status related to the risk based on the calculation result. As to the method of displaying the risk of the first users, for example, as shown in the FIG. 18, for each item, the higher the risk is, the larger the radius of the pie chart is. In the example shown in the FIG. 18, the highest falling risk can be understood. By viewing the status display of the first user, the second user can grasp at a glance the items that are high risk to the first user.

The status display may be configured to be switchable by a prescribed operation input by the second user. For example, we assume that the information processing device 10 controls the terminal device to display a status related to the ADL as shown in the FIG. 17. When the second user makes an operation input to switch the status display, the information processing device 10 may switch the status display on the terminal device from the status display related to ADL shown in the FIG. 17 to the status display related to the risk shown in the FIG. 18. In this way, the second user can easily understand the status they want to check.

The information processing device 10 may control the terminal device to display the status of multiple first users. For example, the information processing device 10 stores the status (e.g., ADL) of the multiple first users in the nursing facility. The information processing device 10 may control the terminal device to display the status related to the ADL for a plurality of first users. Alternatively, the information processing device 10 may control the terminal device to display the status related to the risk for the multiple first users. The FIG. 19 shows an example of a status display regarding the risk of multiple first users. In this way, by displaying the status of multiple first users, it becomes easier to grasp what the trends are as a whole for multiple first users in the nursing facility. If the user (e.g. the second user) presses the "ADL operation details" button in the FIG. 19, the status related to ADLs of multiple first users can be displayed on the terminal device. This makes it easier to understand what kinds of the assistance needs and what tools needed to provide the assistance.

The information processing device 10 may make recommendations about the timing zone of high falling risk and the places of high falling risk and number of caregivers to deal with this situation. The information processing device 10 may compare the number of the expected tools of the assistance with the number of the tools of the assistance which the nursing facility currently possesses and recommend the type and quantity of tools of the assistance that are in short supply. For example, as shown in the FIG. 19, the recommendation "We will need 5 more walkers by **." appears around the status.

Although the present embodiment has been described in detail as described above, a person skilled in the art will readily understand that many modifications can be made that do not materially deviate from the novel matters and effects of the present embodiment. Therefore, all such variations shall be included in the scope of this disclosure. For example, a term appearing at least once in a description or drawing with a different term that is broader or synonymous may be replaced by that different term anywhere in the description or drawing. All combinations of the present embodiment and variations are also included in the scope of this disclosure. Also, the configuration and operation of the information processing device and the information processing method, etc. are not limited to those described in this embodiment, and various modifications can be performed.

What is claimed is:

1. An information processing device operated in a operation mode including at least a user mode and a care mode, the information processing device comprising:
a communicator configured to transmit a control signal for executing control to a peripheral device;
a memory configured to store control contents in association with the user mode and to store control contents associated with the care mode for each type of assistance for a first user that a second user intends to perform, the control content being performed by the peripheral device; and
a controller configured to control the communicator to transmit the control signal to the peripheral device to perform the control content associated with the user mode in response to only a first user being detected in a room by using a detection device for detecting presence of a person in the room, to determine an assistance the second user intends to perform for the first user in the room in response to the second user being further detected in the room by using the detection device, and then to control the communicator to transmit the control signal to the peripheral device which is used for the determined assistance to perform the control content associated with the care mode in response to the second user being further detected in the room by using the detection device.

2. The information processing device according to claim 1, wherein
the controller is configured to identify the type of assistance that the second user intends to perform based on a tool of assistance brought by the second user, and to transmit the control signal to the peripheral device to perform the control content stored in the memory according to the identified type of assistance.

3. The information processing device according to claim 2, further comprising:
an RFID tag configured to be attached to the tool of assistance, and
wherein the controller is configured to identify the type of assistance based on the information of the RFID tag read by an RFID reader.

4. The information processing device according to claim 2, wherein
the type of assistance includes an excretion assistance for assisting excretion of the first user, a meal assistance for assisting meal of the first user, and a transfer assistance for assisting transfer of the first user.

5. The information processing device according to claim 1, wherein
the controller is configured to recognize a person as the first user when only one person is detected in the room by using the detection device, and to recognize another person as the second user when another use is detected in the room while the first user is recognized.

6. An information processing method performed by an information processing device operated in a operation mode including at least a user mode and a care mode, the information processing device comprising a memory configured to store control contents in association with the user mode and the care mode, respectively, the memory being configured to store the control content associated with the care mode for each type of assistance for a first user that a second user intends to perform and the control content being performed by a peripheral device, wherein the information processing method comprising:
detecting a user in a room by using a detection device for detecting presence of a person in the room,
transmitting a control signal from a communicator of the information processing device to the peripheral device to perform the control content associated with the user mode in response to only a first user being detected in the room,
determining an assistance the second user intends to perform for the first user in the room in response to the second user being further detected in the room by using the detection device, and then
transmitting the control signal from the communicator of the information processing device which is used for the determined assistance to perform the control content associated with the care mode in response to the second user being further detected in the room.

7. The information processing device according to claim 1, wherein
the memory is configured to store control content associated with each support stage or support progress stage in each care process, and the support stage includes at least a stage before starting to support the care process, a stage during support the care process, and a stage after completing the care process.

8. The information processing device according to claim 7, wherein
the controller is configured to identify the type of assistance the second user is attempting to provide, and to transmit the control signal to the peripheral device to execute the control content associated with the identified type of assistance.

9. The information processing device according to claim 1, wherein
the controller is configured to turn on a first lighting device, an air conditioner and keep turning off a second lighting device in the care mode in response to the type of assistance corresponding to an excretion assistance for assisting excretion of the first user, wherein the first lighting device and the second lighting device are installed in different locations within the same room.

10. The information processing device according to claim 1, wherein
the controller is configured to turn on a first lighting device, to turn on a second lighting device, and to change a status of an air conditioner from turning on to turning off a in the care mode in response to the type of assistance corresponding to a transfer assistance for assisting transfer of the first user, wherein the first lighting device and the second lighting device are installed in different locations within the same room.

11. The information processing method according to claim 6, further comprising:
identifying the type of assistance that the second user intends to perform based on a tool of assistance brought by the second user, and to transmit the control signal to the peripheral device to perform the control content stored in the memory according to the identified type of assistance.

12. The information processing method according to claim 11, further comprising:
identifying the type of assistance based on information of an RFID tag read by an RFID reader, the RFID tag configured to be attached to the tool of assistance.

13. The information processing method according to claim 11, wherein
the type of assistance includes an excretion assistance for assisting excretion of the first user, a meal assistance for assisting meal of the first user, and a transfer assistance for assisting transfer of the first user.

14. The information processing method according to claim 6, further comprising:
recognizing a person as the first user when only one person is detected in the room by using the detection device, and to recognize another person as the second user when another use is detected in the room while the first user is recognized.

15. The information processing method according to claim 6, further comprising:
storing, in the memory, control content associated with each support stage or support progress stage in each care process, and the support stage includes at least a stage before starting to support the care process, a stage during support the care process, and a stage after completing the care process.

16. The information processing method according to claim 15, further comprising:
identifying the type of assistance the second user is attempting to provide, and to transmit the control signal to the peripheral device to execute the control content associated with the identified type of assistance.

17. The information processing method according to claim 6, further comprising:
turning on a first lighting device, an air conditioner and keep turning off a second lighting device in the care mode in response to the type of assistance corresponding to an excretion assistance for assisting excretion of the first user, wherein the first lighting device and the second lighting device are installed in different locations within the same room.

18. The information processing method according to claim 6, further comprising:
turning on a first lighting device, to turn on a second lighting device, and to change a status of an air conditioner from turning on to turning off a in the care mode in response to the type of assistance corresponding to a transfer assistance for assisting transfer of the first user, wherein the first lighting device and the second lighting device are installed in different locations within the same room.

* * * * *